May 12, 1942.   H. S. JONES   2,282,726
CONTROL APPARATUS
Filed Oct. 25, 1939    6 Sheets-Sheet 1
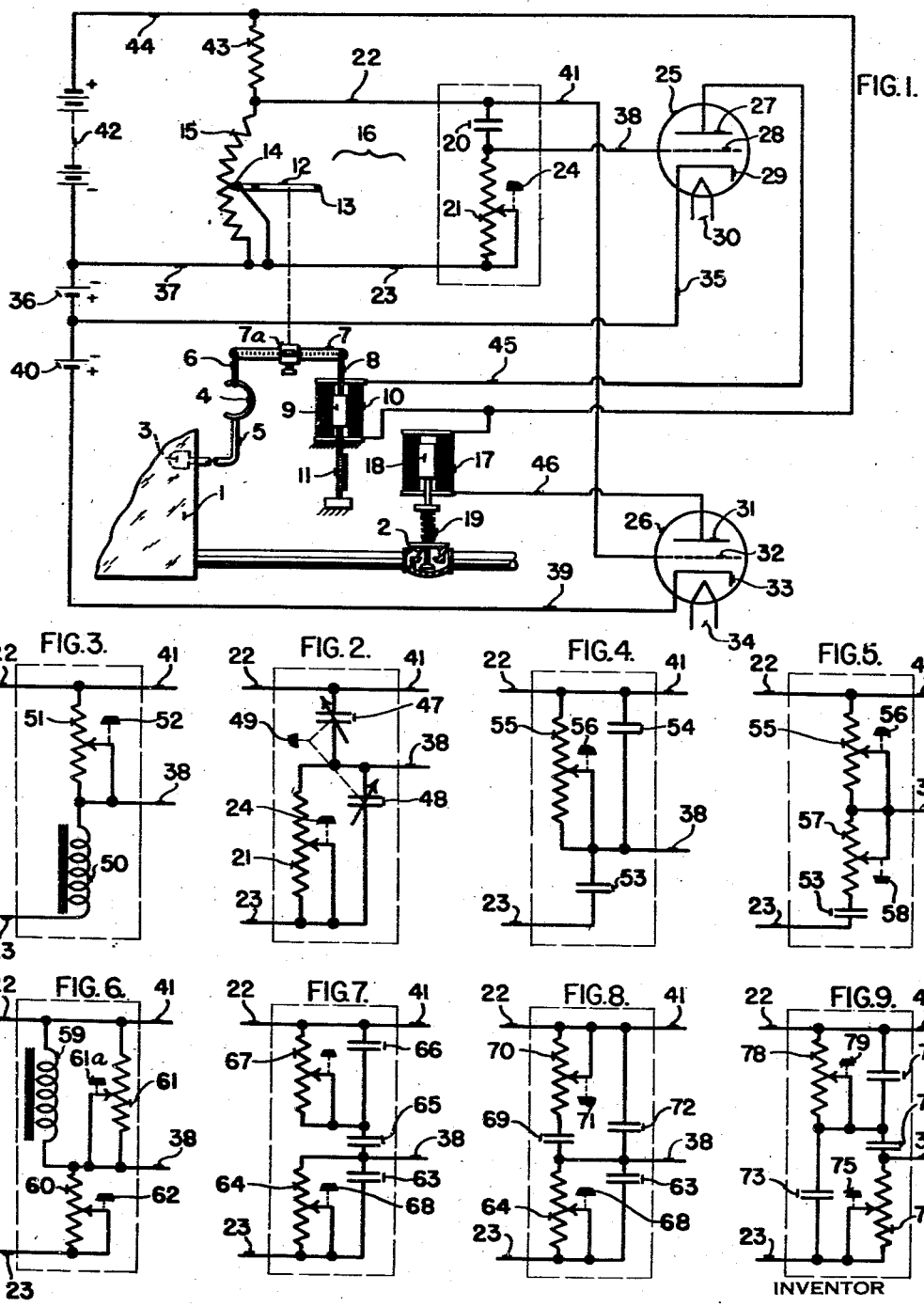
INVENTOR
HARRY S. JONES
BY George M. Beauchamp
ATTORNEY

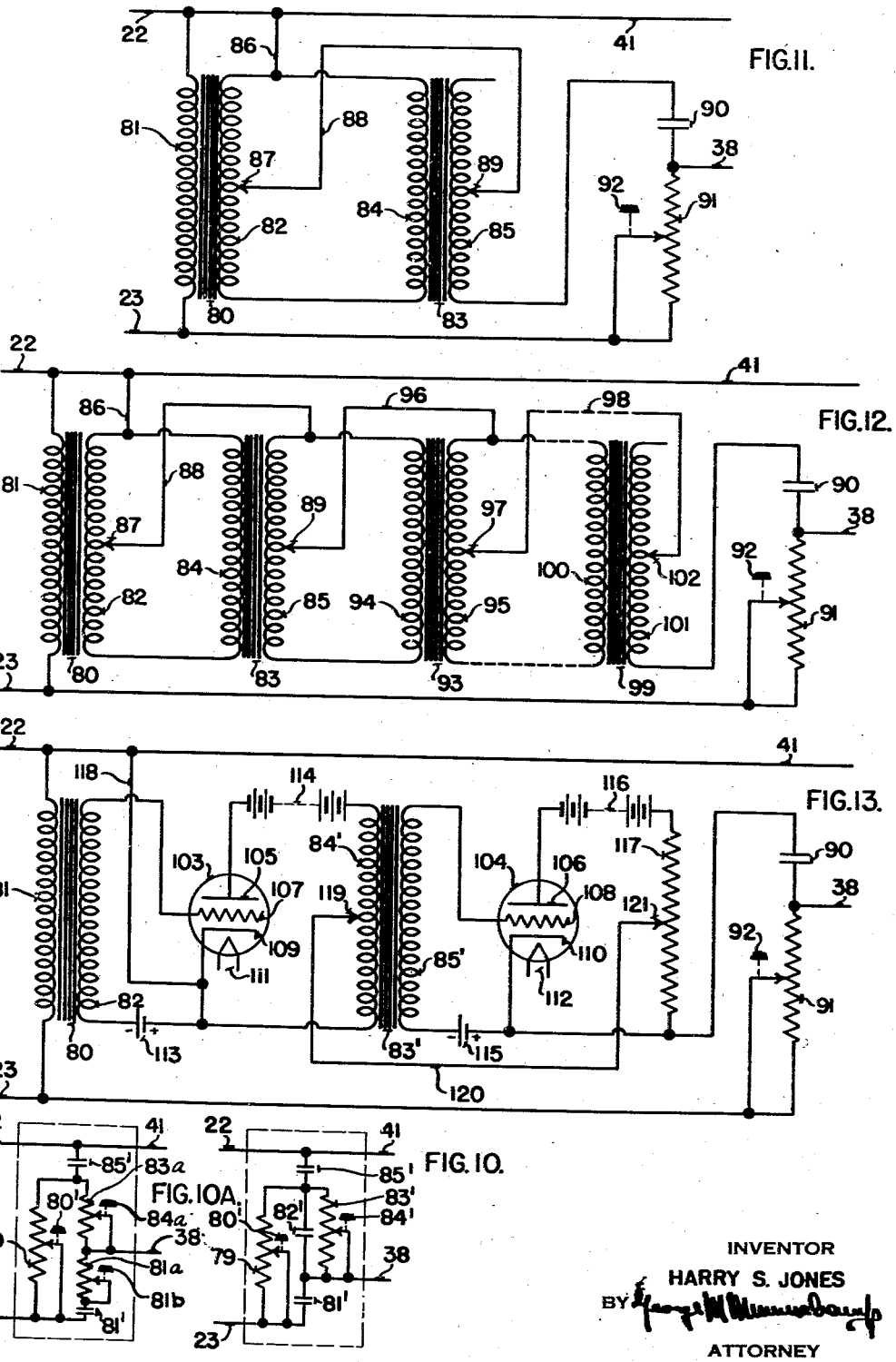

May 12, 1942.  H. S. JONES  2,282,726
CONTROL APPARATUS
Filed Oct. 25, 1939  6 Sheets-Sheet 3

INVENTOR
HARRY S. JONES
BY
ATTORNEY

May 12, 1942.   H. S. JONES   2,282,726
CONTROL APPARATUS
Filed Oct. 25, 1939    6 Sheets-Sheet 4

INVENTOR
HARRY S. JONES
BY
ATTORNEY

May 12, 1942.                     H. S. JONES                     2,282,726
                                CONTROL APPARATUS
                              Filed Oct. 25, 1939              6 Sheets-Sheet 5

INVENTOR
HARRY S. JONES
BY
ATTORNEY

May 12, 1942.  H. S. JONES  2,282,726
CONTROL APPARATUS
Filed Oct. 25, 1939  6 Sheets-Sheet 6
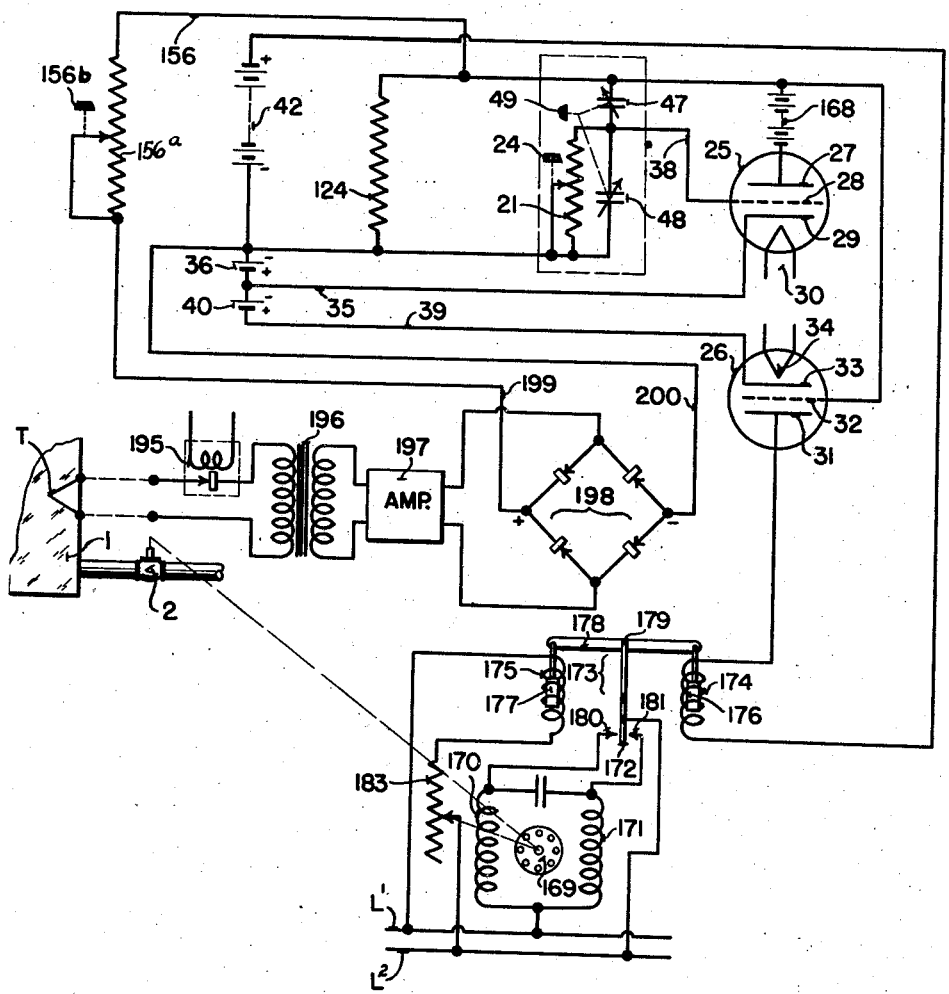

Patented May 12, 1942

2,282,726

UNITED STATES PATENT OFFICE 2,282,726

CONTROL APPARATUS

Harry S. Jones, Philadelphia, Pa., assignor to The Brown Instrument Company, Philadelphia, Pa., a corporation of Pennsylvania Application October 25, 1939, Serial No. 301,174

42 Claims. (Cl. 236—78)

The present invention relates to electrical control apparatus, and particularly to electrical control apparatus adapted to effect suitable corrective variations in the value of a quantity being controlled on a departure of the latter from a predetermined normal value without creating an objectionable tendency to unstable control or hunting.

A general object of the invention is to provide electrical control apparatus, adapted on a change in the value of a variable quantity under control, to produce a corrective change in the controlling medium to restore the quantity to the desired value in the shortest possible time while avoiding the tendency to hunting.

A specific object of the invention is to provide electrical control apparatus embodying physically stationary means for compensating for variations in the characteristics of the quantity being controlled.

Another specific object of the invention is to provide electrical apparatus embodying physically stationary means for effecting an automatic neutralization of an initial control adjustment. Such automatic neutralization of an initial control adjustment is sometimes referred to as a follow-up action.

A further specific object of the invention is to provide electrical control apparatus which is adapted on a change in the value of a variable quantity being controlled to produce a relatively large initial corrective kick or control effect in the controlling medium while avoiding the tendency to hunting which would ordinarily result from such a large initial corrective adjustment.

A further and more specific object of the invention is to provide electrical control apparatus embodying physically stationary means for producing a strong corrective effect in the supply of the controlling medium during the initial stages of a departure of the quantity being controlled from the desired value while avoiding the tendency to hunting which would ordinarily result from such a strong initial corrective effect.

Another specific object of the invention is to provide electrical control apparatus of the character above mentioned wherein the rate of application of the controlling medium is effected in accordance with or in response to the first derivative of the magnitude of the condition with respect to time, that is, in accordance with or in response to the rate of change of the magnitude of the condition.

A still further specific object of the invention is to provide electrical control apparatus of the character above mentioned wherein the rate of application of the controlling medium may be effected in accordance with or in response to the first, second and higher derivatives of the magnitude of the condition with respect to time, as desired.

Another specific object of the invention is to provide electrical control apparatus of the character above mentioned having simple and effective means for adjusting it for desirable operation under different conditions of use.

Electrically operated controllers embodying the features of the present invention may take widely different forms and are adapted for use for many different purposes. In general they may be used whenever it is desirable to produce a control effect in response to a change in a control condition or quantity such, for example, as temperature, pressure, flow, liquid level, etc., which tends to vary as a result of the control effect produced.

In accordance with the present invention suitable provisions are made to prevent variations in the quantity being controlled, which variations may be due to changes in the effect of the controlling medium, to changes in the characteristics or amount of the quantity being controlled, or to any other variable condition. On a change in an operating condition such, for example, as a change in the B. t. u. content of the fuel supply to a furnace, or to a change in the furnace load, the furnace temperature will tend to vary but due to the furnace heat inertia the change in the operating condition will have been existent for some time before it results in a temperature change that is detected by the apparatus employed to maintain the furnace temperature at a desired value. When thereafter a correction in the amount of fuel supplied the furnace is made to restore the furnace temperature to the desired value, such correction will not be effective to immediately restore the desired condition. This lag also is due to the heat inertia of the furnace. Furthermore, if a sufficiently large corrective adjustment is made to restore the furnace temperature to the desired value within a relatively short time and is maintained until that value is reached, the furnace temperature will tend to overshoot that value and subsequent corrective adjustments will result in hunting or oscillation of the furnace temperature about the desired value.

Accordingly, a primary object of the present invention is to provide electrical control apparatus which is adapted to prevent such hunting or oscillation and effect control or regulation at an even given value.

In a preferred form, the present invention includes provisions for effecting a compensating or so-called "reset" adjustment whereby on a change in an operating condition, such, for example, as a change in the load on a furnace which is being controlled to minimize variations in the furnace temperature, the tendency of the furnace load or other operating condition change to increase or decrease the furnace temperature or other controlling condition may be neutralized.

The preferred form of the invention also includes means for effecting an adjustment in the rate of the compensating or reset adjustment whereby on a change in furnace load, or other analogous operating condition, the compensating adjustment necessary to the maintenance of the approximately constant value of the furnace temperature, or other controlling quantity, may be varied to the end that the time required for full compensation for the operating condition change may be reduced to the practical minimum possible without risk of objectionable hunting.

The preferred form of the invention also includes provisions for effecting a relatively large initial corrective adjustment in the amount of the controlling medium supplied to maintain the desired condition and thereafter, before the condition has returned to the desired value, removing the initially large corrective adjustment whereby the tendency to hunting, which would ordinarily result from such large initial corrective adjustment, is avoided.

In a preferred form of the invention, provisions are also included for readily effecting adjustments of the duration and the magnitude of such relatively large corrective adjustment in the rate of application of the controlling medium, or in other words, for readily effecting adjustments of the duration and the extent of magnification of such initial corrective adjustment.

In accordance with the present invention, provisions are also made for effecting such initially large corrective adjustments in the rate of application of the controlling medium in response to the first, second and higher derivatives of the magnitude of the condition, as desired.

The preferred form of the present invention also includes provisions for readily effecting a so-called "throttling range" adjustment whereby the extent to which the fuel valve or the regulator is adjusted, in response to a given change in the furnace temperature, or other control quantity, may be varied.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a control network diagram illustrating one embodiment of the invention;

Figs. 2 and 3 illustrate alternative forms of the reset provisions of the Fig. 1 arrangement;

Figs. 4–6 illustrate modifications of a portion of the Fig. 1 arrangement for effecting control in accordance with the rate of deviation of the condition being controlled from a desired value;

Figs. 7–10 and 10A illustrate modifications of a portion of the Fig. 1 arrangement for effecting the desired reset adjustments and for effecting control in accordance with the rate of deviation in the condition being controlled from a desired value;

Figs. 11 and 13 illustrate modifications of a portion of the Fig. 1 arrangement for effecting control in accordance with the rate of change of the rate of change of the condition being controlled from a desired value;

Fig. 12 illustrates a modification of a portion of the Fig. 1 arrangement for effecting control in accordance with the first, second and any desired higher derivative of the magnitude of the condition being controlled with respect to time; and Figs. 14–20 are diagrammatic views illustrating the combination of the invention with different forms of control apparatus.

Figure 14:
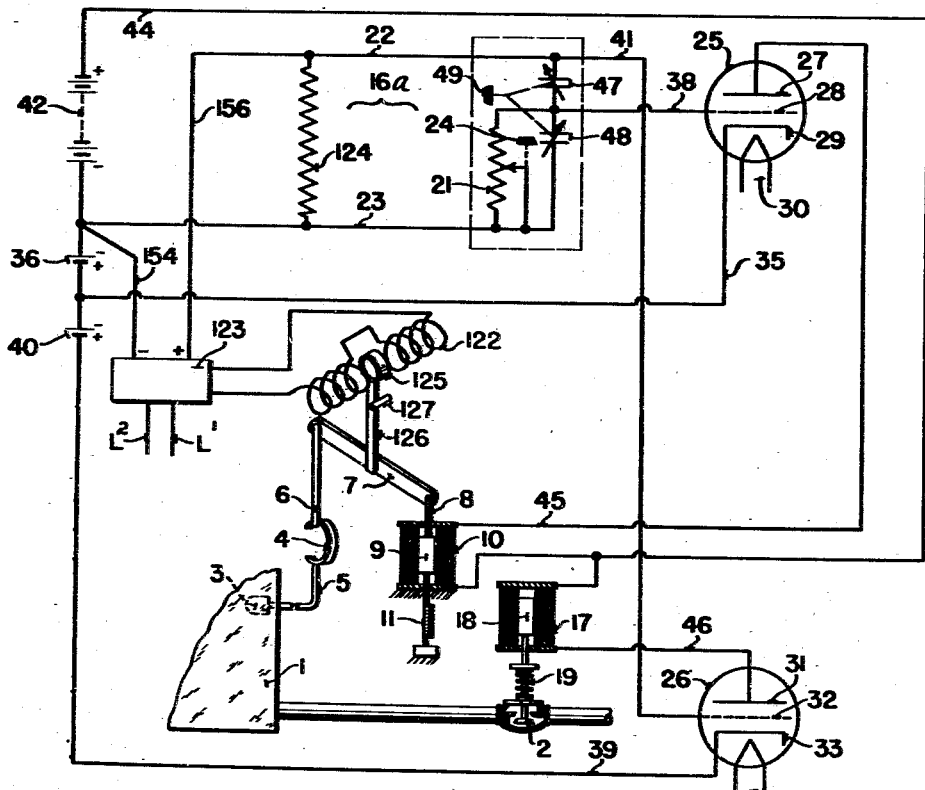

In the embodiment of the invention, illustrated more or less diagrammatically in Fig. 1, the fuel supply to a furnace 1 is regulated by the adjustment of a fuel supply valve 2 in automatic response to variations in the furnace temperature as required to maintain that temperature approximately constant. The furnace temperature is measured by means shown diagrammatically as comprising the bulb 3 of a fluid pressure type thermometer connected to a measuring instrument which includes an actuating element in the form of an arc shaped Bourdon tube 4 to which the thermometer bulb pressure is transmitted by flexible tubing 5. The deflecting end of the Bourdon tube 4 is connected by a link 6 to one end of a floating lever 7 which is connected at its other end by a link 8 to the armature 9 of a solenoid 10. The armature 9 is biased downwardly by gravity and suitable spring means 11 and is pulled upward into the solenoid an amount varying in accordance with energization of the solenoid. A slider 7a, which is adjustable along the length of the lever 7, is connected by link or other means, indicated schematically by the dotted line, to an arm 12, pivoted at one end 13, and which is capable of amplifying the movements of the lever 7. The arm 12 carries an insulated contact 14 on its other end and adjusts that contact along an arcuate resistance 15. The contact 14 is electrically connected to the lower terminal of resistance 15, as seen in Fig. 1, and is adapted to vary the effective value of resistance 15 in circuit when adjusted along that resistance. On an increase or decrease in the furnace temperature, the resulting flexure of the Bourdon tube 4 effects an adjustment of the contact 14 along the resistance 15 up or down respectively, as seen in Fig. 1. In accordance with the present invention the flexure of the Bourdon tube required to effect an adjustment of the contact 14 along the entire length of the resistance 15 is desirably a small or negligible part of the total flexure of the Bourdon tube produced in responding to its whole range of measurement.

The initial effect of any movements of the contact 14 is to produce a change in the potential applied to an electrical control network 16 and thereby to vary the energization of a solenoid 1 as required to effect a corrective adjustment of the fuel valve 2 and also to energize the solenoid 10 to effect a corresponding network neutralizing or follow-up adjustment of the contact 14 to restore said potential to its original value. The solenoid 17 is adapted, when energized, to actuate an armature 18 to open the valve 2 against the opposing and closing action of a helical spring 19.

As illustrated, the electrical control network 16 includes a condenser 20 and a resistance 21 which are connected in series circuit relation and are connected by conductors 22 and 23 across the resistance 15.

It will be apparent that the point of engagement of conductor 22 and the resistance 15 may be adjusted to effect the changes in potential applied to the network 16, if desired, instead of producing those potential changes by varying the magnitude of resistance 15. In such modification, the connection between the contact 14 and the lower end terminal of the resistance 15 may be dispensed with and the left end terminal of the conductor 22 connected to the contact 14 in lieu thereof. In addition the motion of the lever 12 in response to a motion of the lever 7 must be reversed since upward motion of contact 14 in such modification will increase the potential applied the network 16 whereas in the arrangement illustrated upward motion of the contact 14 produces a decrease in that potential. Such reversal of movement of the contact 14 may be effected in any desired manner, for example, by moving the pivot point of the lever 12 to a point between the dotted linkage mechanism and the contact 14.

The resistance 21 is desirably very large in value compared to the value of resistance 15 and is adjustable as, for example, by a knob 24. Changes in the potential applied to the electrical control network 16 are adapted to be detected by a pair of electronic valves 25 and 26. Valve 25 is a heater type triode and includes an anode 27, a control electrode 28, a cathode 29, and a heater filament 30. Valve 26 is also shown as a heater type triode and includes an anode 31, a control electrode 32, a cathode 33, and a heater filament 34. The input circuit of valve 25 may be traced from the cathode 29 to a conductor 35, a battery 36, a conductor 37, conductor 23, resistance 21, and a conductor 38 to the control electrode 28. The input circuit of the valve 26 may be traced from the cathode 33 to a conductor 39, a battery 40, the battery 36, conductors 37 and 23, resistance 21, condenser 20, and a conductor 41 to the control electrode 32.

The output or anode circuits of the valves 25 and 26 are energized by a battery 42 which, as shown, is also connected to the terminals of the resistance 15 through a fixed resistance 43. The output circuit of valve 25 includes the solenoid 10 and may be traced from the positive terminal of the battery 42 to a conductor 44, the solenoid 10, a conductor 45, anode 27, cathode 29, conductor 35, and the battery 36 to the negative terminal of the battery 42. The output circuit of the valve 26 includes the solenoid 17 and may be traced from the positive terminal of the battery 42 to the conductor 44, solenoid 17, conductor 46, anode 31, cathode 33, conductor 39, and the batteries 40 and 36 to the negative terminal of the battery 42. Battery 36, which is connected in the input circuit of the valve 25, tends to maintain a potential on the control electrode 28 which is negative with respect to the potential of the cathode 29 and similarly batteries 40 and 36, which are connected in the input circuit of the valve 26, tend to maintain a potential on the control electrode 32 which is negative with respect to the potential of the cathode 33. As described in detail hereinafter, the potentials of the control electrodes 28 and 32 are made more negative or less negative with respect to their associated cathodes in accordance with the adjustments of the contact 14 along the resistance 15.

When the furnace temperature has been stabilized at the desired value, the potential drop across the resistance 21 will be zero since the condenser 20 will then be charged to the potential drop across resistance 15, and hence the potential on the control electrode 28 of valve 25 will be that maintained thereon by the battery 36 alone. At that time the upward force exerted by the solenoid 10 will be exactly that required to balance the downward pull of gravity and the spring 11 on the armature 9, and the potential on the condenser 20 will be exactly that required to produce the fuel valve adjustment needed to maintain the furnace temperature at the desired value.

The initial effect of any movement of the contact 14 is to change the bias on the control electrode 28 of valve 25 and simultaneously to change the bias on the control electrode 32 of valve 26. Due to the effect of the condenser 20 the potential changes on the control electrodes tend to take place slowly but the resistance 21 introduces a component of potential proportional to the condenser charging current, which charging current, in turn, is proportional to the extent of adjustment of the contact 14. This component of control potential is transient and is applied to produce a transient potential change on the control electrode 28, and thereby to cause a transient force to be set up by the solenoid 10 which is effective to produce a follow-up or neutralizing adjustment of the contact 14. As explained in detail hereinafter, as long as the furnace temperature is displaced from the desired value, such follow-up action produced by the solenoid 10 will also be transient or discontinuous in its effect, and will gradually diminish as the condenser 20 charges or discharges to the value of the potential across the resistance 15.

Specifically, on a decrease in the furnace temperature and a consequent downward adjustment of the slider 7a and of the contact 14, followed by a prolonged period of no further temperature change, for example, the potential applied to the terminals of the condenser 20 and resistance 21 will be increased whereupon charging current will flow through the resistance 21 into the condenser 20 to produce a potential drop across the resistance 21 of the correct polarity to reduce the negative potential on the control electrode 28 of valve 25. This will effect an increase in the conductivity of the valve 25, and consequently an increase in the energizing current flow to the solenoid 10 which, in turn, produces an additional force urging the slider 7a and thereby the contact 14 in the upward direction. The downward adjustment of the contact 14 is thus checked and the latter is given a neutralizing adjustment towards its original position. This adjustment will limit the flow of charging current through resistance 21, and thereby will limit the reduction in the negative potential on the control electrode 28. The system will then be stabilized and the contact 14 will come to rest when the potential on the control electrode 28 is precisely that required to produce the increased energization of the solenoid 10 needed to maintain the contact 14 in its original position. It will be apparent the contact 14 will not be returned to its precise original position, however, but will come to rest at a point slightly below that position because a slightly reduced negative potential must be maintained on the control electrode 28 to produce the increased energization of the solenoid 10 which is then needed. The required displacement of the slider 7a in the downward direction from its original position needed to maintain that increased energization of the solenoid 10 is practically negligible, however, since the valve 25 has a narrow operating range, that is, the valve is capable of having its plate current varied throughout its entire range with a small change in the potential of the control electrode 28, and since a small movement of the lever 7 is capable of effecting a movement of the contact 14 along the entire length of resistance 15. It is noted the valve 26 desirably also has a narrow operating range, that is, is capable of having its plate current varied throughout its entire range with a small change in the potential of the control electrode 32.

Such stabilization of the system will not be continuous in its effect, however, because of the charging action of the condenser 20. As the condenser 20 gradually charges to the new potential across resistance 15, the charging current through resistance 21 decreases to thereby effect a reduction in the potential across the latter which, in turn, effects an increase in the negative potential on the control electrode 28. This causes a decrease in the supply of energizing current to the solenoid 10, and hence, a decrease in the force urging the contact 14 upward. The contact 14 will then be given further downward movement until the negative potential on the control electrode 28 is sufficiently reduced to permit an increased energization of the solenoid 10 of an amount needed to check that downward movement. Due to the continuous action of the condenser 20 in charging to the new potential across resistance 15, such additional downward adjustments of the contact 14 will be required to maintain the increased energization of the solenoid 10 as long as the furnace temperature is displaced from the desired value and will be continuously made until the limit of adjustment of the contact 14 has been reached.

As explained more in detail hereinafter, such downward adjustments of the contact 14 are effected at a suitably slow rate and produce the desired compensating or resetting adjustments of the system. In accordance with the present invention, the condenser 20 and resistance 21 are so chosen that the charging rate of the condenser is suitable for an average or normal full compensating period which varies with the character of the operation controlled.

As will be apparent, the downward adjustment of the contact 14 and the resultant change in potential across resistance 15 is also effective to reduce the negative potential applied to the control electrode 32 of valve 26. This change in potential of the control electrode 32 effects an increase in the supply of current to the solenoid 17 and thereby an opening adjustment of the fuel valve 2. The extent of that fuel valve opening adjustment will be proportional to the furnace temperature change since the change in potential across resistance 15, and thereby the change in potential of control electrode 32, is proportional to the furnace temperature change.

It is noted that the condenser 20 and resistance 21 are ineffective to delay or otherwise directly affect the potential change on the control electrode 32 following a change in the potential across the resistance 15 so that the adjustment of the fuel valve 2 will occur substantially simultaneously with the adjustment of the contact 14. This effect is obtained since the connection of the control electrode 32 to the upper terminal of condenser 20 as seen in Fig. 1 renders the valve 26 incapable of detecting the transient nature of the potential drop across resistance 21.

When the furnace temperature is at the desired value, the flow of current to the solenoid 10 is exactly that required to balance the weight of the armature 9 and the downward pull of the spring 11 with the contact 14 at a position along resistance 15 such that the potential of the control electrode 32 of valve 26 is precisely the value required to maintain the furnace heat input equal to the furnace heat output. It is noted that for steady operation, with varying rates of heat output, it is theoretically necessary that the contact 14 should occupy slightly different positions and that the furnace temperature maintained be lower with a large rate than with a small rate of heat output. In accordance with the present invention, however, the differences between the stable operation positions of the Bourdon tube 4 for different furnace loads may be made so small as to correspond to furnace temperatures which do not differ by practically significant or measurable amounts. This end is obtained since the deflection of the Bourdon tube 4 required to produce movement of the contact 14 along the entire length of the resistance 15 is a suitably small part of the total deflection thereof.

If the opening adjustment given the fuel valve 2 on a furnace temperature departure is not sufficient to return the furnace temperature to the desired value, the contact 14 will be given additional compensating adjustments in the direction of its initial adjustment; namely, downward on a temperature decrease and upward on a temperature increase. These adjustments of the contact 14 are effective to produce the additional adjustments in the fuel valve 2 required to restore the furnace temperature to the desired value, and are obtained as a result of the fact that the potential produced across resistance 21, on movement of the contact 14, is transient. On a temperature decrease, for example, as the transient potential across resistance 21 diminishes and the condenser 20 charges to the potential across resistance 15, the potential on the control electrode 28 of valve 25 increases in the negative direction, and hence the follow-up, or neutralizing, action of the solenoid 10 on the contact 14 is reduced. The subsequent additional downward adjustments of the contact 14 increase the potential drop across resistance 15 and thereby increase the potential stored on condenser 20. As a result the negative potential on the control electrode 32 of valve 26 is further reduced and accordingly additional fuel valve opening adjustments are effected.

Those additional opening adjustments of the valve 2 will be continuously and gradually effected as long as the furnace temperature is displaced from the desired value and, moreover, will be effected at a rate corresponding to the character of the operation being controlled. Such additional fuel valve adjustments are known to those skilled in the art as compensating or resetting adjustments and are effective to prevent stabilization of the furnace temperature at a value displaced from the desired control point and consequently are effective to return the furnace temperature to the desired value. The rate of those adjustments may be varied as desired by adjustment of resistance 21 by knob 24, and accordingly the apparatus of my invention may be suited to the characteristics of the operation it is desired to control. If desired, the resetting rate may be varied by adjustment of the capacity of condenser 20. The effect of either of those adjustments is to vary the charging rate of condenser 20 and thereby the rate of the adjustments of the contact 14 during the time the furnace temperature is displaced from the desired value.

The operation of the apparatus of Fig. 1 on an increase in furnace temperature is substantially identical to that described above in connection with a furnace temperature decrease, and differs therefrom only in that the condenser 20 discharges instead of charges and the potentials of the control electrodes 28 and 32 are increased in the negative direction instead of decreased.

The apparatus illustrated in Fig. 1 also includes means for effecting a control range or follow-up adjustment commonly referred to as a throttling range adjustment particularly when the control element is a valve such as the valve 2. The throttling or control range adjustment varies the extent of adjustment of the valve 2 produced by a given deflection of the Bourdon tube 4 in response to a furnace temperature change. The extent of the valve adjustment produced by a given deflection of the Bourdon tube 4 is determined by the magnitude of the current change in the solenoid 10 required to effect a follow-up adjustment of the contact 14. In the form of the invention shown in Fig. 1, the throttling range adjustment is effected by manually varying the position of slider 7a along the floating lever 7. The effect of that adjustment is to vary the extent of movement of the contact 14 on a given deflection of the Bourdon tube 4 and thereby the adjustment of the fuel valve 2. It will be apparent that suitable scale markings may be provided on the lever 7 to permit ready adjustment of the throttling range to any desired setting.

In Figs. 2–13 I have illustrated, more or less diagrammatically, various circuit arrangements which may be employed in lieu of the condenser 20 and the resistance 21 of Fig. 1 to adapt the system of Fig. 1 to the characteristics of the application it is desired to control. The characteristics of control applications differ, and accordingly, in order to obtain smooth, efficient control, it is desirable to provide control apparatus which exactly suits those characteristics. A practically important feature of the present invention is the ease with which the control apparatus may be adjusted to the characteristics of the control application in which it is to be employed, which will be readily apparent by reference to the drawings wherein it will be noted any of the circuit arrangements of Figs. 2–13 may be bodily substituted for the condenser 20 and resistance 21 of Fig. 1. No other change of the apparatus of Fig. 1 is required.

Specifically, in Figs. 2 and 3 I have illustrated alternative circuit arrangements which may be employed in lieu of the condenser 20 and resistance 21 of Fig. 1 to effect the desired follow-up and compensating or resetting adjustments of the system. As described in detail hereinafter, the circuit arrangement of Fig. 2 also includes an alternative arrangement for effecting the desired throttling range adjustments of the system.

As illustrated in Fig. 2, a variable condenser 47 is employed in lieu of the condenser 20 of Fig. 1 and a variable condenser 48 is connected in shunt with the resistance 21. The operation of this modification of my invention is substantially the same as that described in connection with the arrangement of Fig. 1 but the provision of the variable condensers 47 and 48 permit the throttling range adjustments of the system to be effected by manipulation thereof. As will be apparent to those skilled in the art, and as may be proved mathematically, the throttling range of the modification of Fig. 2 is proportional to the quotient of $$\frac{C_1}{C_1 C_2}$$

where $C_1$ is the capacity of condenser 47 and $C_2$ is the capacity of condenser 48, and the rate of reset of the system is proportional to the quantity $$\frac{1}{(C_1 C_2) R}$$

where R is the resistance of the resistance 21.

Referring to the above equations it will be noted that the throttling range and reset adjustments of the system may be varied by adjustment of either $C_1$ or $C_2$. Moreover, it will be noted that if $C_1$ and $C_2$ are varied simultaneously and in such manner that their sum remains constant, throttling range adjustments of the system may be made without varying the rate of reset.

Accordingly, in this form of my invention, the desired throttling range adjustments of the system may be effected by simultaneously varying the capacity of condensers 47 and 48 by increasing the capacity of one condenser and decreasing the capacity of the other at the same rate, and for this purpose a knob 49 mechanically connected to both of the condensers 47 and 48 is provided. With this modification, therefore, the adjustable slider 7a of Fig. 1 may be permanently fixed in position and the desired throttling range adjustments effected by manipulation of the knob 49. The desired rate of reset adjustments may be effected by varying the resistance 21 by manipulation of the knob 24.

In Fig. 3 I have illustrated a modification of the arrangement disclosed in Fig. 1 for effecting the desired compensating or resetting adjustments of the system. As shown, the condenser 20 and the resistance 21 have been dispensed with and an inductance 50, having negligible resistance, and a resistance 51 have been provided in lieu thereof. The inductance 50 and resistance 51 are connected in series between the conductors 22 and 23 and have their point of engagement connected by conductor 38 to the control electrode 28 of valve 25. The resistance 51 is adjustable as for example, by a knob 52, and has its upper end, as seen in Fig. 3, connected by conductor 41 to the control electrode 32 of valve 26.

When the system embodying this form of my invention is stabilized, a steady value of current will be conducted by the resistance 51 and inductance 50, and since the latter has a negligible resistance, the potential drop thereacross will be substantially zero whereby the potential on the control electrode 28 of valve 25 will be mainly that maintained thereon by the battery 36. On a decrease in the furnace temperature and a consequent downward adjustment of the contact 14 along resistance 15, followed by a prolonged period of no further temperature change, however, the potential applied between the conductors 22 and 23 will be suddenly increased whereupon the current flow through resistance 51 and inductance 50 will be increased. Due to the inductive characteristic of element 50, however, the sudden increase in potential will momentarily appear in its entirety across the inductance 50 since the latter tends to prevent any change in the current flow therethrough. As a result, the negative potential of the control electrode 28 of valve 25 will be suddenly reduced and consequently the energization of the solenoid 10 will be correspondingly increased. This will produce a follow-up or return movement of the contact 14 toward its original position to thereby stabilize the system.

Such stabilization of the system will not be permanent as long as the furnace temperature is displaced from the desired value, however, since the inductance 50 is incapable of continuously preventing the change in the flow of current therethrough in response to a change in position of the contact 14 along resistance 15. As the current flow through the inductance and resistance gradually increases to its new steady value, more and more of the potential change will be transferred from the inductance 50 to the resistance 51 until substantially the whole potential change produced by the adjustment of contact 14 is established across the resistance 51.

As a result of this action the potential on the control electrode 28 of valve 25 will be gradually increased in the negative direction and hence the energization of the solenoid 10 will be gradually reduced whereby the latter will permit further downward adjustments of the contact 14 along resistance 15. Such additional downward adjustments of the contact 14 produce further increases in the potential applied to the terminals of the inductance 50 and resistance 51 and thereby further reductions in the negative potential on the control electrode 28 of valve 25 and consequently further increases the energization of the solenoid 10 to check those downward adjustments of the contact 14. This operation continues until the contact 14 has reached the limit of its downward adjustment, and it is noted, is exactly the same as that produced by condenser 20 and resistance 21 of Fig. 1.

By properly choosing the values of inductance 50 and resistance 51, it will be apparent that the building up of the current through the inductance 50, and resistance 51 and thereby the downward adjustments of the contact 14, may be effected at a suitably slow rate to produce the desired compensating or resetting adjustments of the system. In this embodiment of my invention, adjustments of the rate of the resetting adjustments of the system may be effected by varying the value of the resistance 51, as for example, by manipulation of the knob 52.

In Figs. 4–6 I have illustrated, more or less diagrammatically, various circuit arrangements which may be employed in lieu of the condenser 20 and the resistance 21 of Fig. 1, and which are adapted to effect a corrective adjustment of the fuel valve 2 in response to the rate of change of the furnace temperature from the desired value, as well as in accordance with the extent of deviation of the furnace temperature. Stated differently the arrangements of Figs. 4–6 are adapted to effect an initial magnification in the corrective adjustment of the fuel valve 2 of an amount proportional to the rate of temperature change in addition to effecting an adjustment of the fuel valve in accordance with the amount of the temperature change. The effect of initially magnifying the corrective adjustment of the fuel valve 2 is to permit the greater part of the corrective adjustment to be applied during the time of increasing departure of the furnace temperature from the desired value, and a reduction of that adjustment at a suitable time before the temperature has returned to the desired value, thus avoiding overshooting and consequent hunting. As illustrated, the circuit arrangement shown in Fig. 4 includes a condenser 53 connected in series with a parallel connection of a condenser 54 and a resistance 55 between the conductors 22 and 23, the condensers and the resistance of this arrangement being connected between the conductors 22 and 23 in an inverse manner with respect to the connection of the condensers 47 and 48 and the resistance 21 of Fig. 2 between said conductors. As shown, the resistance 55 is adjustable by a knob 56.

The initial magnification in the fuel valve adjustment effected with this arrangement is obtained as a result of a transient effect introduced by the arrangement of condensers 53 and 54 and resistance 55, as shown. This transient effect is adapted to minimize follow-up adjustments of the contact 14 by the solenoid 10, in response to a furnace temperature change, for a period determined by the charging rate of the condenser 53. On an initial adjustment of the contact 14 along the resistance 15, for example, the condenser 53 will not immediately reflect the potential change across resistance 15 to the control electrode 28 of valve 25 but will gradually transfer that potential change thereto as the condenser 53 charges to the new value of potential across the resistance 15. The potential change across resistance 15 will immediately be reflected to the control electrode 32 of valve 26, however, and thereby effect an immediate adjustment of the fuel valve 2. Thereafter, as the condenser 53 charges and a resulting follow-up action of the contact 14 is effected by the solenoid 10, the magnitude of the fuel valve adjustment will be reduced. The duration of the initial magnification in the control effect produced may be varied by adjustment of the knob 56. The effect of that adjustment is to vary the time required to charge and discharge the condenser 53 and thereby to vary the duration of the delay in the follow-up adjustment produced by the solenoid 10.

The effect of such operation, when the condensers 53 and 54 and the resistance 55 are properly chosen, is to permit the initial corrective control effect in the supply of heat to the furnace to be much larger than would be possible otherwise without resulting in overshooting and hunting. This end is obtained because the greater part of the correction is applied during the time of increasing departure of the furnace temperature from the desired value and is removed at a suitable time before the furnace temperature has returned to the desired value.

It is noted that if the condenser 54, in shunt to the resistance 55, is omitted in the arrangement of Fig. 4, the system tends to adjust the fuel valve 2 to its extreme positions on each slight change in temperature. This is undesirable in some control applications since it renders the system unstable and thereby promotes hunting. While the inertia and friction of the fuel valve 2 may be such as to prevent such extreme adjustments of the fuel valve 2 and thereby minimize the tendency of the system to be unstable, it is noted that the friction of the fuel valve is not constant in its effect but is variable and will vary the extent of successive initial fuel valve adjustments and thereby render the system erratic. The use of condenser 54, however, produces a predetermined and instantaneous follow-up adjustment of the contact 14, and hence limits the extent of the intial fuel valve adjustment to a desirable value.

The modification of my invention illustrated in Fig. 5 includes alternative provisions for positively adjusting the extent of the initial magnification in the fuel valve adjustments, as desired. As illustrated, this modification differs from that shown in Fig. 4 by the inclusion of a resistance 57 in series with the condenser 53 between the upper terminal of the latter and the conductor 38. In this form the condenser 54 of Fig. 4 has also been omitted although that condenser may be employed, if desired.

With this arrangement, on a change in the potential applied to the conductors 22 and 23, for example, on a decrease in furnace temperature, the resulting flow of charging current through resistance 57 to the condenser 53 will produce a potential drop thereacross which will be of the proper polarity to increase the conductivity of the valve 25 and thereby the energization of the solenoid 10. That increased energization of the solenoid 10 will effect a follow-up adjustment of the contact 14 along resistance 15 of an amount determined by the adjustment of the resistance 57, and thereby limit the extent of the initial adjustment of the fuel valve 2 to a predetermined value. In this form of my invention, as in the arrangement of Fig. 4, the duration of the initial magnification in the fuel valve adjustment may be varied by adjustment of resistance 55.

In Fig. 6 I have illustrated another circuit arrangement which may be employed in lieu of the condenser 20 and resistance 21 of Fig. 1 to effect the desired initial magnification in the fuel valve adjustments. As shown, an inductance 59, which is shunted by an adjustable resistance 61, is connected in series with a resistance 60 between the conductors 22 and 23, and the point of engagement of the inductance and resistance is connected by the conductor 38 to the control electrode 28 of valve 25. The upper terminal of the inductance 59 is connected by the conductor 41 to the control electrode 32 of the valve 26.

In this arrangement the inductance of the element 59 tends to momentarily present sudden changes of current therethrough and thus momentarily assumes any changes in the potential applied to the conductors 22 and 23. As a result, on a change in the adjustment of the contact 14 along resistance 15, no change in potential will momentarily take place on the control electrode 28 of valve 25, while the full change in potential will immediately be applied to the control electrode 32 of valve 26. This will effect an initially large corrective adjustment of the fuel valve 2 which will be gradually reduced as the current flow through the inductance 59 gradually increases. That increased current flow through resistance 60 will produce a change in the potential drop thereacross and thereby a change in the potential of the control electrode 28 of valve 25 which in turn will effect a follow-up adjustment of the contact 14 along resistance 15 to reduce the magnitude of the fuel valve corrective adjustment. In this arrangement the duration of the initial magnification in the fuel valve corrective adjustment may be varied by adjustment of the resistance 60 as, for example, by a knob 62. The resistance 61 is provided to effect an initial follow-up adjustment of predetermined amount and thereby limits the magnitude of the fuel valve corrective adjustment to a desired value, and is shown adjustable by a knob 61a.

In Figs. 7–10 and 10A I have illustrated various modifications of the arrangement of Fig. 1 which are adapted to effect both resetting and initial magnification adjustments of the system on departure of the furnace temperature from the desired value as well as to effect control in accordance with the extent of departure of the furnace temperature from the desired value. Throttling range adjustments may be effected in these embodiments of my invention by adjustment of the slider 7a along the lever 7 as described in connection with Fig. 1.

In Fig. 7 I have illustrated an embodiment of my invention wherein a series circuit arrangement, including a condenser 63 and a resistance 64 connected in parallel, a condenser 65, and a condenser 66 and a resistance 67 connected in parallel, connected between the conductors 22 and 23. The point of engagement of the parallel connected condenser 63 and resistance 64 and the condenser 65 is connected by the conductor 38 to the control electrode 28 of valve 25, and the upper terminal of the parallel connected condenser 66 and resistance 67 is connected by the conductor 41 to the control electrode 32 of valve 26.

The initial magnification adjustments produced with this arrangement are obtained by virtue of a transient effect introduced by the parallel connected condenser 66 and resistance 67. As noted hereinbefore, on a furnace temperature change, for example, on a decrease in temperature, the voltage applied to the conductors 22 and 23 will be increased by an amount proportional to the decrease in temperature. That increase in voltage applied to the conductors 22 and 23 immediately effects a reduction in the negative potential applied to the control electrode 32 of valve 26 and thereby an increase in the supply of energizing current to the solenoid 17, which increase in current, in turn, effects an opening adjustment of the fuel valve 2. Simultaneously, the negative potential on the control electrode 28 of valve 25 is reduced, and as a result, the supply of energizing current to the solenoid 10 is increased. That increase in current to the solenoid 10 effects a follow-up or return adjustment of the contact 14 towards its original position, as explained hereinbefore, to reduce the potential applied to the conductors 22 and 23. Due, however, to the transient potential drop produced across the condenser 66 and resistance 67, the follow-up adjustment of the contact 14 will be smaller than that which would be effected if the condenser 66 and the resistance 67 were omitted. After a predeterminal interval, the condenser 66 will be completely discharged through the resistance 67 and thereby the potential across that condenser and resistance will be reduced to zero. That potential is not simply dissipated, however, but will gradually appear across condenser 65 and the parallel connected resistance 64 and condenser 63, dividing in accordance with the relative capacities of the condensers 63 and 65. Thus the negative potential of the control electrode 28 will be further reduced and consequently an additional follow-up adjustment of the contact 14 will be produced. The effect of that additional follow-up adjustment of the contact 14 is to further decrease the potential applied to the conductors 22 and 23 and thereby to increase the negative potential applied to the control electrode 32 of valve 26. This will effect a decrease in the energization of the solenoid 17 and, hence, a closing adjustment of the fuel valve 2. The condenser 66 and the resistance 67 are desirably so proportioned in relation to the other circuit components that the initial fuel valve opening adjustment and subsequent closing adjustment are effected during the beginning of the furnace temperature cycle of variation.

With this arrangement, therefore, it will be noted that on a furnace temperature change, followed by a prolonged period during which no further change in temperature takes place, an initially large opening adjustment of the fuel valve 2 will be effected which is followed at the end of a suitable time interval by a reduction in that valve opening adjustment. Thereafter, resetting adjustments of the fuel valve 2 will be effected until the furnace temperature has returned to the desired value. The resetting adjustments effected with this arrangement are obtained in the same manner as they are obtained in the circuit arrangements previously described and accordingly further description of this part of the system operation is believed unnecessary. It is noted, however, that the rate of those resetting adjustments may be effected by adjustment of the resistance 64 by knob 68.

In the foregoing explanation of the operation of the apparatus modifications of Figs. 4-7, the condition considered has been that wherein the contact 14 is given an initial adjustment by the Bourdon tube 4 in response to a furnace temperature change and then is given no further adjustments by the Bourdon tube. It will be apparent, however, that in actual operation the adjustments of the Bourdon tube are gradual. In the Fig. 7 form, for example, if the contact 14 is adjusted slowly and continuously in the same direction, the tendency for the magnification in the adjustment of the fuel valve 2 to build up to its maximum value will be decreased by the discharging of the condenser 66 through resistance 67, and accordingly the magnification will assume an intermediate value determined by the rate of adjustment of the contact 14. The magnification of the adjustment of the fuel valve 2 will thus vary in proportion to the rate of adjustment of the contact 14 and will be larger when the rate of adjustment of the contact 14 is larger since the potential on the condenser 66 will discharge to a greater extent on slow adjustments of the contact 14 than on rapid adjustments thereof.

The effective magnification in the adjustment of the fuel valve 2 obtained with the Figs. 4-7 forms of my invention is thus seen to be one which may be expressed mathematically in terms of rate of change since the magnitude of the magnification obtained is proportional to the rate of change in the condition being controlled.

In Fig. 8 I have illustrated a modification of the arrangement of Fig. 7 wherein a condenser 63 is connected in shunt to the resistance 64 and a condenser 69 and a resistance 70 which is adjustable by a knob 71, are connected in series across the terminals of a condenser 72. With this arrangement the initial follow-up adjustment of the contact 14 effected by the solenoid 10 will be smaller than that effected by the arrangement of Fig. 1 because of a transient potential produced across the resistance 70. The effect of that transient potential is to temporarily prevent the potential of the control electrode 28 of valve 25 from assuming the true potential corresponding to the adjustment of the contact 14, as in the modifications of Figs. 4-7, whereby the follow-up adjustment of the contact 14 will be smaller than it otherwise would be. As the condenser 69 charges or discharges, however, the potential across resistance 70 will gradually diminish and will be absorbed partly by the condenser 72 and partly by the resistance 64 and condenser 63 in accordance with the relative capacities of the condensers 63 and 72.

This effect is produced because of the fact that the time required to charge the condenser 69 is appreciably smaller than that required to charge the condensers 63 and 72. Thus, after a suitable time interval, the negative potential on the control electrode 28 of valve 25 is further reduced and consequently an additional follow-up adjustment of the contact 14 is effected. The magnitude of that time interval is determined by the charging rate of the condenser 69, which charging rate may be varied as desired by adjustment of resistance 70 by the knob 71. Thus, an initially large correction in the fuel valve adjustment will be effected on the occurrence of a furnace temperature change, and thereafter a reduction in the fuel valve adjustment will be effected as in the arrangement of Fig. 7.

In Fig. 9 I have illustrated another modification of the arrangement of Fig. 7 which may be employed for effecting the initial magnification and the compensating or resetting adjustments of the system. As illustrated, a condenser 73, which is shunted by a resistance 74 and a condenser 76, is connected in series with a parallel connection of a condenser 77 and a resistance 78 between the conductors 22 and 25. The point of engagement of the resistance 74 and the condenser 76 is connected by the conductor 32 to the control electrode 28 of valve 25 and the upper terminal of the parallel connected condenser 77 and resistance 78 is connected by the conductor 31 to the control electrode 32 of valve 26. The resistances 74 and 78 are adjustable by knobs 75 and 79, respectively, for effecting the desired resetting and initial magnification adjustments.

In this arrangement, as in the modifications of Figs. 7 and 8, the initial follow-up adjustment of the contact 14 along the resistance 15 which is effected by the solenoid 10 will be smaller than that effected by the arrangement of Fig. 1 due to the occurrence of a transient potential produced across the condenser 77 and resistance 78. The effect of that transient potential is to temporarily prevent the potential of the control electrode 28 of valve 25 from assuming the true potential corresponding to the position to the contact 14 and, as a result, the initial follow-up adjustment of the contact 14 will be smaller than it otherwise would be. The condenser 77 and resistance 78 are so proportioned in relation to the other condensers and resistance of this embodiment that, as the condenser 77 charges or discharges, the potential across the latter and the resistance 78 will gradually diminish and will be assumed by the condensers 73 and 76 in accordance with the relative capacities of the latter. Thus, after a suitable time interval the negative potential on the control electrode of valve 25 will be reduced and as a result an additional follow-up adjustment of the contact 14 will be effected. The magnitude of that time interval is determined by the charging rate of the condenser 77 which, in turn, may be varied by adjustment of the resistance 78 by the knob 79.

It is noted, however, that the full follow-up adjustment of the contact 14 will not be produced in this arrangement until the condenser 76 has discharged. As the latter discharges into the condenser 73, the negative potential of the control electrode 28 of valve 25 will be further reduced and accordingly a further follow-up action of the contact 14 will be effected. Thus, in this form of my invention the rate at which the initial magnification in the fuel valve adjustment is reduced may be made to differ materially from the rate at which the arrangements of Figs. 7 and 8 are adapted to reduce the initial magnification effect and may be made to conform to the particular characteristics of the application under control by properly proportioning the various condensers and resistances.

In this arrangement, as in the load compensating arrangements previously described, as the condenser 73 charges to the potential applied to the conductors 22 and 23, the potential drop across the resistance 74 gradually diminishes, and accordingly the negative potential on the control electrode 28 of valve 25 gradually increases with the result that the follow-up action of the contact 14 is reduced. This effects a further adjustment of the contact 14 in the direction of its original movement, and thereby produces additional opening adjustments of the fuel valve 2 which continue as long as the furnace temperature is displaced from the desired value or until the contact 14 has reached the limit of its adjustment.

With this arrangement, as with the arrangement of Figs. 7 and 8, an initially large correction in the fuel valve adjustment will be effected on the occurrence of a furnace temperature change which will be immediately followed by a reduction in that fuel valve adjustment and will be subsequently followed by a compensating or resetting adjustment of the fuel valve 2 to return the furnace temperature to the desired value.

In Fig. 10 I have illustrated another modification of the arrangement of Fig. 7 for effecting the desired initial magnification and compensating adjustments of the system. In this arrangement a resistance 79, which has connected in shunt thereto a condenser 81' in series with a condenser 82' and a resistance 83' connected in parallel, is connected in series with a condenser 85' between the conductors 22 and 23. The point of engagement of the condensers 81' and 82' is connected by the conductor 38 to the control electrode 28 of valve 25 and the upper terminal of the condenser 85' is connected by the conductor 41 to the control electrode 32 of valve 26. The resistances 79 and 83' are adjustable by knobs 80' and 84', respectively, and are provided for effecting the desired compensating and initial magnification adjustments of the system.

In this arrangement, the initial magnification in the fuel valve adjustments are effected due to the action of the condenser 82' and the resistance 83' in temporarily delaying the maximum change in potential of the control electrode 28 of valve 25 in response to an adjustment of the contact 14, and the compensating or resetting adjustments of the system are effected as a result of the potential on the condenser 85' gradually building up to the new potential established between the conductors 22 and 23.

In Fig. 10A I have illustrated still another modification of the arrangement of Fig. 7 for effecting the desired initial magnification and compensating adjustments of the system wherein means are provided for adjusting the ratio of the initial to the intermediate fuel valve corrective adjustments. In this form of my invention a condenser 85' and an adjustable resistance 79 are connected between the conductors 22 and 23, and two resistances 83a and 81a and a condenser 81' are connected in shunt to the resistance 79. The point of engagement of the resistances 81a and 83a is connected by the conductor 38 to the control electrode 28 of valve 25 and the upper terminal of the condenser 85' is connected by the conductor 41 to the control electrode 32 of valve 26. The resistances 79 and 83a are adjustable by knobs 80' and 84a and are provided for effecting the desired compensating and initial magnification adjustments of the system. The resistance 81a is also adjustable, as for example, by a knob 81b and is provided for effecting adjustments in the ratio between the fuel valve adjustments as initially effected and the intermediate adjustments which are produced when the magnification factor has reduced to one.

In Figs. 11-13 I have illustrated, more or less diagrammatically, further modifications of the circuit arrangement of Fig. 1 which may be employed to provide control in accordance with or in response to the first and/or higher derivatives of the magnitude of the condition with respect to time in addition to providing control in accordance with the extent of departure of the condition from the desired value and effecting the desired resetting adjustments. As will be apparent to those skilled in the art, it is possible to effect smoother and more efficient control when the control is effected in accordance with the first and/or higher derivatives of the magnitude of the condition with respect to time.

Specifically, in Fig. 11, I have illustrated a modification of the arrangement of Fig. 1 wherein the rate of application of the controlling medium is adapted to be effected in response to the extent of departure of the condition and also in accordance with the first and second derivatives of the magnitude of the condition with respect to time, that is, in response to the rate of change of the magnitude of the condition and also the rate of the rate of change of the magnitude of the condition. As illustrated, the primary winding 81 of a transformer 80, having a secondary winding 82, is connected between the conductors 22 and 23, and the terminals of the secondary winding 82 are connected to the primary winding 84 of a transformer 83. The upper terminal of the transformer secondary winding 82, as seen in Fig. 11, is connected by a conductor 86 to the conductor 22 and an adjustable tap 87 on that winding is connected by a conductor 88 to an adjustable tap 89 on the secondary winding 85 of the transformer 83. The lower terminal of the secondary winding 85 is connected to the upper terminal of a condenser 90. The conductor 23 is connected through a resistance 91, which is adjustable by a knob 92, to the lower terminal of the condenser 90, and the point of engagement of the condenser 90 and resistance 91 is connected by the conductor 38 to the control electrode 28 of valve 25. The conductor 22 is connected by the conductor 41 to the control electrode 32 of valve 26.

Referring to the arrangement of Fig. 11 it will be noted that the conductor 22 is connected to the conductor 38 and thereby the control electrode 28 of valve 25 through a circuit arrangement including a portion of the transformer secondary winding 82 and a portion of the transformer secondary winding 85. As will be apparent, when the current flow through the transformer primary winding 81 is steady in value, no voltage will be induced in the secondary winding 82 and consequently no voltage will be induced in the secondary winding 85. If the condition has been stabilized for an appreciable period the potential on the condenser 90 will then have built up to the potential between the conductors 22 and 23, and accordingly, no current will be flowing in the circuit including the transformer secondary windings 82 and 85, the condenser 90 and the resistance 91. The potential on the control electrode 28 of valve 25 will then be that maintained therein by the battery 56 alone.

On a change in the furnace temperature, for example, on a decrease in temperature, the potential applied to the terminals of the transformer primary winding 81 will be increased and accordingly a potential will be induced in the transformer secondary winding 82. This latter potential will produce a current flow through the transformer primary winding 84 which in turn will induce a potential in the transformer secondary winding 85. Thus, a potential is established on the circuit arrangement including the transformer secondary windings 82 and 85, condenser 90 and the resistance 91 which is proportional to the rate of change of the potential applied to the transformer primary winding 81 and is also proportional to the rate of change of the potential induced in the transformer secondary winding 82. That is to say, a potential is established on that circuit arrangement which varies in accordance with the rate of change and also the rate of the rate of change in the position of the contact 14 along the resistance 15. This potential is applied to the control electrode 28 of valve 25 and, thus, is adapted to effect a follow-up adjustment of the contact 14 in accordance with the rate of change and also the rate of the rate of change of the furnace temperature.

It is noted the effect of this potential is to delay the application to the control electrode 28 of valve 25 of the full change in potential effected by the adjustment of the contact 14, and thereby to produce a magnification in the initial fuel valve adjustment, as in the arrangements of Figs. 7–10 and 10A. The arrangement of Fig. 11, however, is adapted to effect such delayed action, and hence initial magnification in the fuel valve adjustment, in accordance with the rate of change and also the rate of the rate of change of the furnace temperature and in certain control applications is, therefore, more desirable than the arrangements of Figs. 7–10 and 10A which are adapted to effect control only in accordance with the rate of temperature change. The duration of that delayed action is determined by the inductance of the transformers 80 and 83 and the magnitude of the control effect produced may be varied by adjustment of the contacts 87 and 89 along their associated transformer windings. As the potentials induced in the transformer windings 82 and 85 diminish, the negative potential of the control electrode 28 of valve 25, for the case considered above, namely a furnace temperature decrease, will be reduced and a follow-up action of the contact 14 will be produced to reduce the initially large fuel valve adjustment.

As the potential on the condenser 90 gradually increases to that between the conductors 22 and 23, the negative potential on the control electrode 28 of valve 25 is gradually increased whereby the energization of the solenoid 10 is decreased and the follow-up movement of the contact 14 is reduced. This will produce a further change in the potential applied to the conductors 22 and 23 and thereby effect a further opening adjustment of the fuel valve 2. Such additional adjustments will be effected as long as the furnace temperature is displaced from the desired value or until the contact 14 has reached the limit of its displacement and are the compensating or resetting adjustments required to return the furnace temperature to the desired value.

In Fig. 12 I have illustrated a modification of the arrangement of Fig. 11 which is adapted to effect control in response to the first, second and higher derivatives of the magnitude of the condition with respect to time, as desired. As illustrated, this arrangement differs from the arrangement of Fig. 11 only in the inclusion of any desired number of additional transformers and, for purposes of illustration, two additional transformers indicated schematically by the reference numerals 93 and 99 have been shown. In this form of my invention, the terminals of the transformer secondary windings 85 are connected to the terminals of the primary winding 94 of the transformer 93 which also has a secondary winding 95. The terminals of the transformer secondary winding 95 are shown connected by dotted lines to the terminals of the primary winding 100 of the transformer 99 which also has a secondary winding 101. The dotted line connection between the secondary winding 95 and the primary winding 100 is employed to indicate that any desired number of transformers may be connected therebetween. The adjustable tap 89 on the transformer secondary winding 85 is connected by conductor 90 to the upper terminal of the transformer secondary winding 95 and an adjustable tap 97 of the latter is connected by a conductor 98, indicated by dotted lines, to an adjustable tap 102 on the secondary winding 101. The lower terminal of the transformer secondary winding 101, as seen in Fig. 12, is connected through the condenser 90 and the resistance 91 to the conductor 23. This arrangement operates substantially in the same manner as the arrangement of Fig. 11 and differs therefrom only in that it permits control in accordance with higher derivatives than the second of the magnitude of the condition with respect to time.

It is noted that when control is effected in response to higher derivatives than the second of the magnitude of the condition with respect to time, the control apparatus tends to effect a quick corrective adjustment of the fuel valve 2 and thereafter a reduction of that corrective adjustment to the value required to maintain the furnace temperature at the desired value. Control of this kind is desirable in that the fuel valve corrective adjustments may be applied during the time of increasing departure of the furnace temperature from the desired value and may be reduced at a suitable time before the furnace temperature has returned to the desired value, thus avoiding hunting.

While theoretically the most desirable control would be that effected in accordance with the $n$th derivative of the magnitude of the condition with respect to time, it is noted a system so operated will tend to provide a large corrective adjustment of the fuel valve 2 for a very short interval, which large corrective action would subject the walls of the furnace to a sudden large temperature change and therefore, would tend to cause deterioration of the walls. In practice, therefore, it is desirable that the maximum opening adjustment of fuel valve should be so limited as to prevent such large applications of fuel to the furnace or the fuel valve adjustments should be effected in accordance with a lower derivative of the magnitude of the condition with respect to time. The actual form which the apparatus of my invention will take thereof is determined by practical operating conditions, the characteristics of the condition which is to be controlled, and the closeness at which it is desired to maintain the value of the condition to the desired value.

In Fig. 13 I have illustrated more or less diagrammatically a modification of the arrangement of Fig. 11 wherein means are provided for amplifying the potential induced in the transformer secondary windings 82 and 85. Such means are desirable when it is desired to effect control in accordance with minute changes in the position of the contact 14, and as illustrated, include a pair of electronic valves 103 and 104. The valves 103 and 104 are heater type triodes, and respectively include anodes 105 and 106, control electrodes 107 and 108, cathodes 109 and 110 and heater filaments 111 and 112.

As illustrated the cathode 109 of valve 103 is connected by a battery 113 and the transformer secondary winding 82 to the control electrode 107, the battery 113 being so connected as to normally apply a negative potential on the control electrode 107. The anode circuit of valve 103 is energized by a battery 114 and includes the primary winding 84' of the transformer 83'. The input circuit of the valve 104 includes the transformer secondary winding 85' and a battery 115 which is so connected as to normally apply a negative potential to the control electrode 108. The anode circuit of the valve 104 is energized by a battery 116 and includes a resistance 117.

As illustrated, the conductor 22 is connected by a conductor 118 to the cathode 109 of valve 103 and a tap 119 on the transformer primary winding 84' is connected by a conductor 120 to a tap 121 on the resistance 117. The lower terminal of the resistance 117 is connected through the condenser 90 and resistance 91 to the conductor 23. Thus, a circuit arrangement is provided between the conductors 22 and 23 which includes a portion of the primary winding 84', a portion of the resistance 117, the condenser 90 and the resistance 91. On a change in the position of the contact 14 along resistance 15 a potential will be established in the transformer primary winding 84' which is proportional to the rate of change of the position of the contact, and a potential will be established across the resistance 117 which is proportional to the rate of change of the rate of change of the position of the contact. This arrangement provides control in accordance with the first and second derivatives of the magnitude of the condition with respect to time as does the arrangement of Fig. 11. As will be apparent the amplifying means of Fig. 13 may be employed in the arrangement of Figs. 11 and 12, if desired.

In summary, Figs. 1-3 disclose alternative arrangements for effecting an adjustment of the fuel valve 2 in accordance with the magnitude of the furnace temperature change, and also for effecting the desired resetting and throttling range adjustments of the system. Figs. 1 and 2 disclose the use of an electrical capacitive network for accomplishing the desired resetting adjustments and Fig. 3 discloses the use of an electrical inductive network for this purpose. Fig. 1 discloses the provision of a slider 7a which is adjustable along the length of the floating lever 7 for the purpose of effecting throttling range adjustments of the system. This means for effecting throttling range adjustments of the system may also be utilized in conjunction with the arrangement of Fig. 3. In Fig. 2 the throttling range adjustments may be effected electrically by simultaneous adjustments of the condensers 47 and 48.

Figs. 4-6 disclose alternative arrangements for effecting an adjustment of the fuel valve 2 in accordance with the magnitude of the furnace temperature change, and also for effecting an initial magnification in the corrective adjustment of the fuel valve 2 of an amount proportional to the rate of change of the furnace temperature. Figs. 4 and 5 disclose the use of an electrical capacitive network for accomplishing the desired initial magnification in the corrective adjustment of the fuel valve 2, and Fig. 6 discloses the use of an electrical inductive network for this purpose. Fig. 4 discloses the use of a condenser 54 for the purpose of limiting the extent of the initial magnification adjustment of the fuel valve. Fig. 5 relies on the inherent friction in the fuel valve 2 and the operating means thereof to limit the extent of the initial magnification adjustments of said fuel valve. In Fig. 6 the resistance 60 is made adjustable for the purpose of adjusting the extent of the initial magnification in the adjustment of the fuel valve 2.

Figs. 7-10 and 10A disclose alternative arrangements for effecting an adjustment of the fuel valve 2 in accordance with the magnitude of the furnace temperature change, for effecting an initial magnification in the adjustment of the fuel valve 2 of an amount proportional to the rate of the furnace temperature change, and for effecting the desired resetting adjustments of the system. In each of Figs. 7-10 and 10A electrical capacitive networks are utilized to accomplish the desired results. In Figs. 7-10 the extent of the initial magnification in the adjustment of the fuel valve 2 is limited by the provision of a capacitance in the network. In Fig. 10A variation in the initial adjustment of the fuel valve 2 to the intermediate adjustment thereof may be produced by manipulation of the resistance 81a.

Figs. 11-13 disclose alternative arrangements for effecting corrective adjustments of the fuel valve 2 in accordance with the magnitude of the furnace temperature change, for effecting an initial magnification in the corrective adjustment of the fuel valve 2 of an amount proportional to the first and higher derivatives of the magnitude of the furnace temperature change, and for effecting the desired resetting adjustments of the system. In Figs. 11 and 13 the initial magnification in the corrective adjustment of the fuel valve 2 is in accordance with the first and second derivatives of the magnitude of the furnace temperature change. In Fig. 12 an initial magnification in the corrective adjustment of the fuel valve 2 of an amount proportional to the first and any desired number of higher derivatives of the magnitude of the furnace temperature change may be effected. Fig. 13 is a modification of Fig. 11 and discloses the use of electronic amplifying means for effecting the desired initial magnification adjustments.

In Fig. 14 I have illustrated, more or less diagrammatically, a modification of the arrangement of Fig. 1 wherein a control network 16a, including a circuit arrangement as shown in Fig. 2, has been substituted for the control network 16 of Fig. 1 and the adjustment of that network in response to furnace temperature changes are adapted to be effected by means including a pair of frictionless and physically independent devices. One of those devices, indicated by the reference numeral 122, is electrically connected to the input terminals of an oscillator and an amplifier 123 which has its output terminals connected across the resistance 124 which corresponds to the resistance 15 of Fig. 1. The other of said physically independent devices, indicated by the reference numeral 125, is carried on the upper end of a vertically extending arm 126 which is rigidly connected at its lower end to the lever 7 at a point intermediate the ends thereof. As illustrated, a stop 127 is provided to limit the deflection of the arm 126. The oscillator and amplifier 123 is illustrated in detail in Fig. 15.

Figure 15:
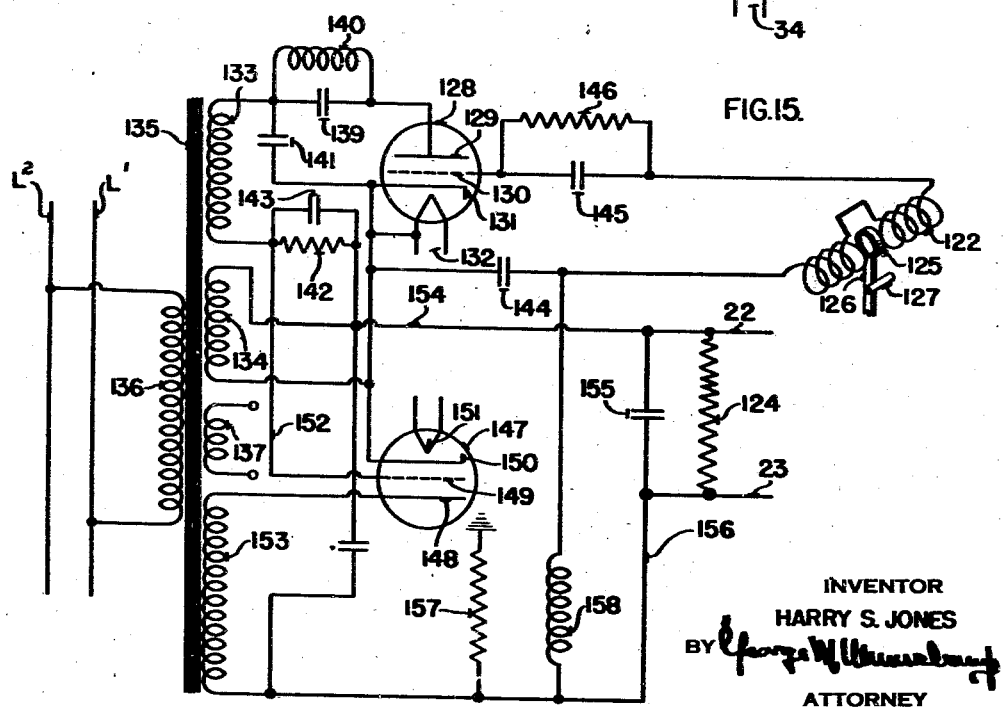

The device 122 comprises a pair of adjacent spirally wound coils which are connected in series as shown in Fig. 15, and is connected to the input circuit of an electronic tube 128. The device 125 comprises a single short circuited turn of low resistance wire and, if desired, may be in the form of a metallic vane. The electronic tube 128 includes an anode 129, a control electrode 130, a cathode 131 and a heater filament 132, and is supplied anode voltage from the secondary windings 133 and 134 of a transformer 135 which also includes a line voltage primary winding 136 having its terminals connected to the alternating voltage supply conductors L¹ and L², and secondary windings 137 and 153. Means are provided for tuning the anode circuit of the valve 128 including a condenser 139 and an inductance 140, which are connected in parallel between the anode 129 and the upper terminal of the secondary winding 133, and a condenser 141 connected between that terminal of winding 133 and the cathode 131. A resistance 142, shunted by a condenser 143, is inserted in the conductor between the lower end of the secondary winding 133 and the upper end of the winding 134. The spiral coil 122, as shown, is connected in the input circuit of the valve 128 and has one terminal thereof connected through a condenser 144 to the cathode 131 and the other terminal connected through a condenser 145, which is shunted by a resistance 146, to the control electrode 130. When the short circuited winding is out of the province of the winding 122, the input circuit of valve 128 is resonant and minimum current will flow in the output circuit thereof. This flow of output current through the valve passes through the resistance 142 and produces a potential drop of predetermined value across the latter. When the short circuited coil 125 is moved between the spiral coils of the device 125, the input circuit of the valve 128 is detuned and as a result increased current will flow in the output circuit thereof. This increased flow of output current produces an increased potential drop across the resistance 142.

The resistance 142 has its terminals connected to the input circuit of an electronic valve 147 which includes an anode 148, a control electrode 149, a cathode 150, and a heater filament 151. As shown, the negative terminal of the resistance 142 is connected by a conductor 152 to the control electrode 149 and the positive terminal of the resistance 142 is connected through the transformer secondary winding 134 to the cathode 150. The resistance 142 and the secondary winding 134 are thus seen to be connected in series between the control electrode 149 and the cathode 150 of the valve 147 and it is noted the transformer secondary winding 134 tends to apply a positive potential to the control electrode of the valve 147 during the half cycles when the voltage on the anode 148 is positive and the resistance 142 tends continuously to apply a negative potential to the control electrode 149.

Anode voltage is supplied the valve 147 from the transformer secondary winding 153 through a circuit which may be traced from the upper terminal of the winding 153 to the anode 148, cathode 150, the transformer secondary winding 134, a conductor 154, the resistance 124 shunted by a condenser 155 and a conductor 156 to the lower terminal of the winding 153. As illustrated, the lower terminal of the winding 153 may desirably be connected to ground potential through a resistance 157 of suitable value, and may also be connected to the left end terminal of the device 122 through an inductance or choke coil 158.

Thus, when the short circuited winding 125 is out of the province of the device 122, a minimum potential drop will be produced across the resistance 142 and the potential of the control electrode 149 of valve 147 will be such that appreciable current will be conducted by the latter. As a result, an appreciable potential drop will be produced across the resistance 124. The pulsations in this potential drop, due to the energization of the output circuit of the valve 147 with alternating current, are smoothed out by the condenser 155. When the short circuited winding 125 moves closer to the device 122 and passes between the spiral coils, as, for example, on an increase in the temperature to which the bulb 3 is subjected, greater current will be conducted by the valve 128 whereby an increase in the potential drop across resistance 142 will be effected. The effect of that increase in potential drop across resistance 142 is to render the potential on the control electrode 149 of valve 147 more negative to thereby reduce the conductivity of the valve 147 and effect a decrease in the potential drop across resistance 124. Such variations in the potential drop across resistance 124 are gradually effected as the short circuited winding 125 is moved into and out of the spiral coils of the device 122 in response to furnace temperature changes.

The operation of the modification illustrated in Fig. 14 is otherwise substantially the same as that described in connection with Figs. 1 and 2 and hence, further description of this embodiment of my invention is believed unnecessary.

Figure 16:
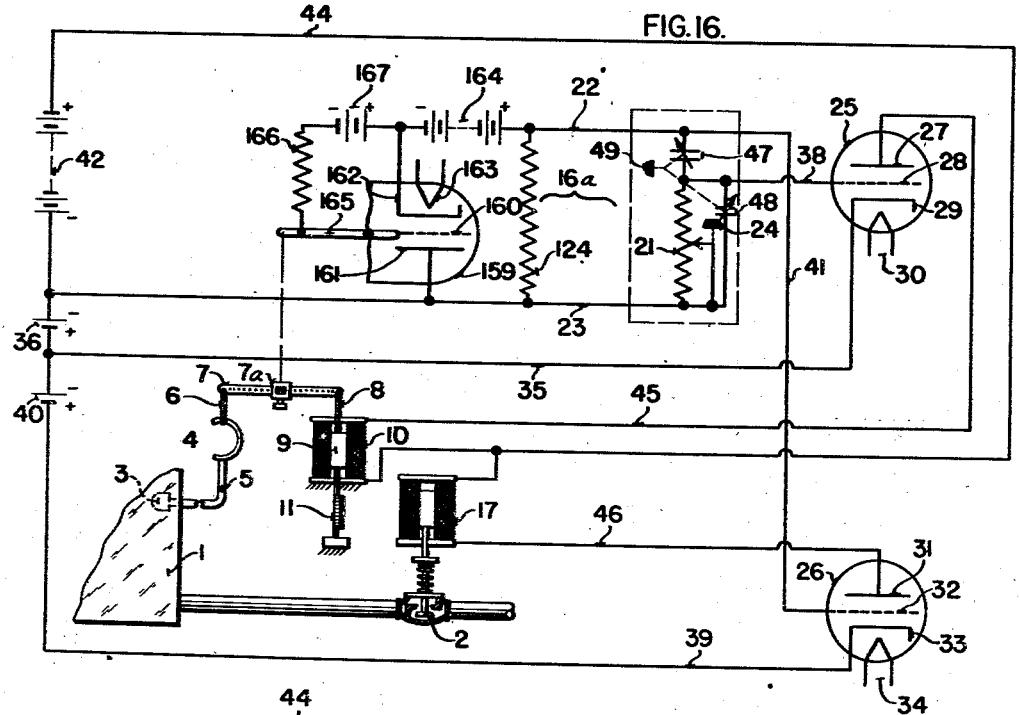

In Fig. 16 I have illustrated a further modification of the arrangement of Fig. 1 wherein a control network 16a has been substituted for the control network 16 of that arrangement, as in the modification of Fig. 14, and the adjustments of the network 16a are effected by means including an electronic valve 159 which is adapted to be varied in conductivity by the external adjustment of its control electrode 160. The valve 159 also includes an anode 161, a cathode 162 and a heater filament 163 and is supplied anode voltage from a battery 164 through a circuit including the resistance 124.

As illustrated, a point intermediate the ends of the floating lever 7 is connected by means, which may be similar to the mechanism connecting the contact 14 to the lever 7 in Fig. 1, to one end of a lever 165 which extends into the interior of the valve 159 and carries the control electrode 160 on the other end thereof. The lever 165 is pivoted by flexible means at its point of entrance into the valve 159 and is adapted to move the control electrode 160 relative to the anode and cathode of that valve in accordance with furnace temperature changes. The lever 165 is of electrically conducting material and is connected through a resistance 166 and a battery 167 to the cathode 162 of valve 159. The battery 167 normally maintains a negative potential on the control electrode 160. As will be apparent the adjustments of the control electrode 160 in response to furnace temperature variations will vary the conductivity of the valve and thereby produce a potential drop across the resistance 124 which varies in accordance with the furnace temperature changes. These variations in potential drop across the resistance 124 are effective to produce changes in the fuel supply to the furnace as required to restore and maintain that temperature at the desired value as described in connection with Fig. 1.

Figure 17:
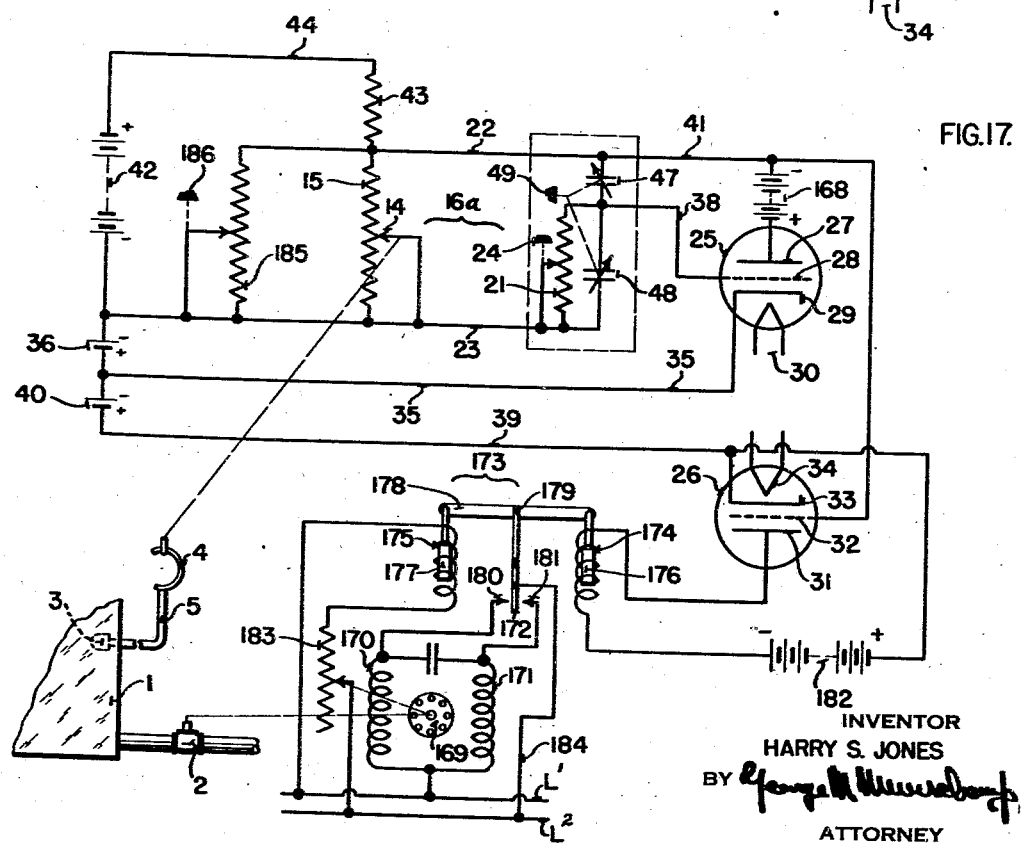

In Fig. 17 I have illustrated, more or less diagrammatically, a still further modification of the arrangement of Fig. 1 wherein the lever 7, the link elements 6 and 8, and the solenoid 10 of that arrangement, have been dispensed with and wherein the desired follow-up adjustments are effected electrically rather than physically as in Fig. 1. In this embodiment the output circuit of the valve 25 may be traced from the positive terminal of the battery 42 to the conductor 44, resistance 43, conductor 22, a battery 168, anode 27, cathode 29, conductor 35, and battery 36 to the negative terminal of the battery 42. Variations in the anode current of valve 25, produced in response to adjustments of the contact 14 along resistance 15, thus, produce corresponding variations in the potential drop across resistance 15, and produce an effect corresponding to the follow-up adjustments of the contact 14 by the solenoid 10 in Fig. 1. In this modification the contact 14 is adjusted relatively to the resistance 15 in accordance with the deflections of the Bourdon tube 4, and it is noted the contact 14 will be moved over the entire length of resistance 15 as the Bourdon tube 4 deflects throughout its entire range. Anode voltage is supplied the valve 25 from the batteries 42 and 168. The battery 168 is preferably of such capacity that the voltage on the anode is maintained constant notwithstanding changes in the load on the battery 42 as are produced by adjustments of contact 14 along resistance 15.

With this arrangement, on a decrease in furnace temperature, for example, the contact 14 will be adjusted downward to thereby produce an increase in the potential drop across resistance 15. That increase in potential drop will effect a corresponding reduction in the negative potential on the control electrode 28 of valve 25, which reduction in negative potential, in turn, will effect an increase in the conductivity of valve 25 and a consequent increase in the potential drop across resistance 43. The effect of that increased potential drop across resistance 43 is to lower the potential drop across resistance 15 and hence to produce a follow-up action to stabilize the system as described in connection with Fig. 1.

In this arrangement the fuel valve adjustments are effected by a rotating type reversible electrical motor 169 having a pair of windings 170 and 171 which are adapted to be selectively energized to produce opening and closing adjustments respectively of the fuel valve 2. The selective energization of the motor windings 170 and 171 is controlled in accordance with the deflections of a movable contact 172 of a differential relay 173. The differential relay includes a pair of coils 174 and 175 and also a pair of armatures 176 and 177 which extend part way into the relay coils 174 and 175 respectively. The movable contact 172 is carried by a lever 178 which is pivoted at a point 179 and carries the armatures 176 and 177. The armatures 176 and 177 are connected to the lever 178 at points on opposite sides of the pivot point 179 so that when one or the other of the relay coils 174 and 175 is energized to a greater extent than the other, the associated armature will be pulled farther into the coil and rotate the lever 178 about its pivot point to thereby effect movement of the contact 172 into engagement with one or the other of a pair of contacts 180 and 181. When both of the coils are equally energized or deenergized, the lever 178 is automatically adjusted to a position wherein the contact 172 is intermediate the contacts 180 and 181.

The relay coil 174 is connected in the output circuit of the electronic valve 26 which as shown is energized by a battery 182, and the other relay coil 175 is connected through an adjustable resistance 183 to the alternating voltage supply conductors L¹ and L². The movable contact 172 is connected by a conductor 184 to the alternating supply conductor L² and the contacts 180 and 181 are connected to a respective terminal of the motor windings 170 and 171. The other terminals of the motor windings are connected to the supply conductor L¹ so that on deflection of the contact 172 into engagement with one or the other of the contacts 180 and 181, the motor will be energized for rotation in one direction or the other. For example, on an increase in the energizing current through the relay winding 174 and the consequent deflection of the contact 172 into engagement with the contact 180 the motor will be energized for rotation in the direction to effect an opening adjustment of the fuel valve 2. Simultaneously the resistance 183 will be adjusted by the motor to decrease the resistance in circuit with the relay winding 175 and thereby increase the energization of that winding. When the energization of the relay windings 174 and 175 are equal the contact 172 will assume a position intermediate of the contacts 180 and 181 and the motor 169 will not be energized for rotation in either direction and will thereby remain stationary.

As illustrated, a resistance 185 which is adjustable by a knob 186 may desirably be connected in parallel to the resistance 15 for effecting throttling range adjustments for the system. Such adjustments vary the normal potential drop across resistance 15 and thereby vary the change in potential produced between the conductors 22 and 23 on a given adjustment of the contact 14 by the Bourdon tube 4. It is noted throttling range adjustments may also be effected in this form of my invention by adjustment of the condensers 47 and 48 by manipulation of the knob 49 as described in connection with Fig. 2.

Figure 18:
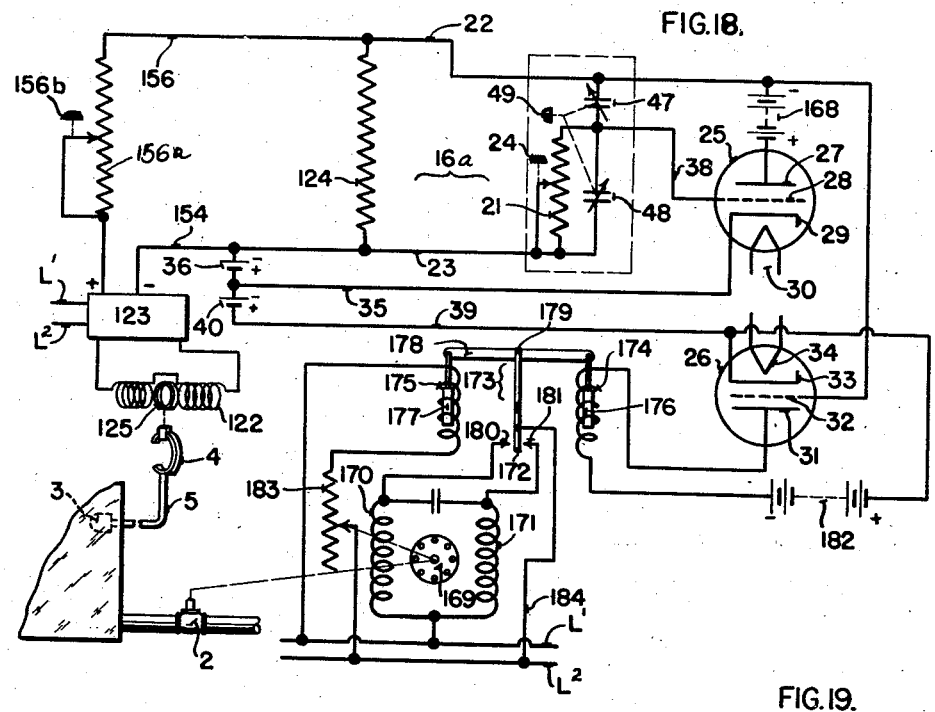

In Fig. 18 I have illustrated a modification of the arrangement of Fig. 17 wherein the frictionally engaging contact 14 and resistance 15 of the latter have been replaced by a pair of physically independent devices 122 and 125 and the associated oscillator and amplifier 123, which are described in detail in connection with Fig. 15, and the follow-up adjustments of the system, in response to a furnace temperature change, are effected electrically by the flow of anode current of valve 25 through resistance 124. In this embodiment of my invention, a resistance 156a which is adjustable by a knob 156b, is provided for effecting throttling range adjustments of the system.

Figure 19:
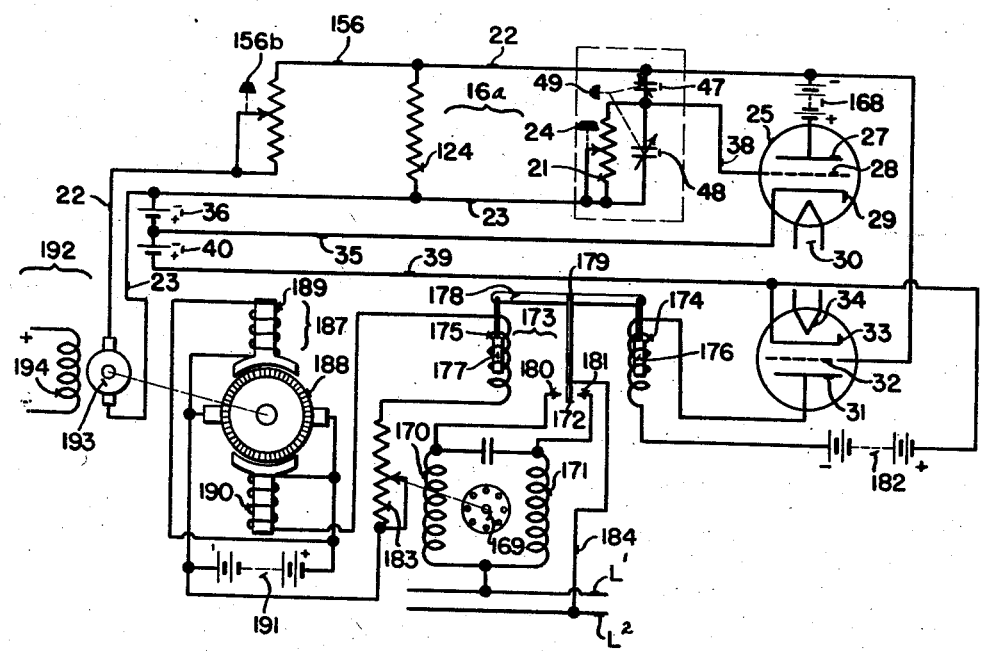

In Fig. 19 I have illustrated an adaptation of the present invention to controlling a characteristic of a dynamo-electric machine. Specifically, in Fig. 19 I have illustrated an arrangement embodying my invention which is adapted to regulate the speed of an electric motor 187. The motor 187 is of the direct current type and comprises an armature 188, a shunt field winding 189 and a regulator field winding 190, and is supplied with energizing current from a battery or source of power 191. The armature 188 and the shunt field winding 189 are connected directly across the terminals of battery 191.

A direct current generator 192 is directly connected to the shaft of motor 187 and, as shown, comprises an armature 193, having the polarity shown in the drawings, and a field winding 194 which is continuously energized from a direct current power source, not shown. The armature current of the generator 192 is applied to the conductors 22 and 23 and produces a potential drop across the resistance 124 which is proportional to the speed of rotation of motor 187. The resistance 124 is connected in a control network 16a, as shown, and corresponds to the resistance 15 of Fig. 1, for example.

In this modification, the motor 169, which is controlled as to rotation in response to variations in the potential drop across resistance 124, is employed to control the supply of current to the regulator field winding 190 of motor 187. As illustrated, the field winding 190 is connected to the terminals of the battery 191 through the resistance 183 and the differential relay coil 175. Thus, on deflection of the movable contact 172 of relay 173 into engagement with one or the other of the contacts 180 or 181, the motor 169 will be energized for rotation in a corresponding direction and effect an adjustment of the resistance 183 as required to restore the speed of rotation of the motor 187 to the desired value. With this arrangement stability of the regulating operation is effected, as in the previous arrangements described, by means of the condenser-resistance arrangement provided in the control network 16a. It will be understood, however, that since the inertia characteristics of the motor 187 are widely different from those ordinarily encountered in a furnace, the values of the various condensers and resistances must be proportioned accordingly.

In Fig. 20 I have illustrated a further modification of the arrangement of Fig. 17 wherein the Bourdon tube type of thermometer of that arrangement is replaced by a thermocouple T. In this embodiment of my invention suitable provisions are made to produce a potential drop variable in magnitude across the resistance 124 in accordance with variations in magnitude in the small electromotive force generated by the thermocouple. Those provisions include an interrupter 195 and a transformer 196 for transforming the thermal E. M. F. into an alternating current which may be readily amplified. An amplifier 197 is employed to amplify that alternating current, and a rectifier 198, shown as a copper oxide rectifier, is employed to transform that amplified alternating current quantity into a direct current. That direct current is applied by conductors 199 and 200 to the terminals of the resistance 124 and produces a potential drop thereacross which varies in accordance with the variations in the thermal E. M. F. and thereby in accordance with the furnace temperature changes. Those variations in potential drop across resistance 124 are effective, as described hereinbefore in connection with Fig. 17 to produce adjustments of the motor 169 and thereby the fuel valve 2 as required to maintain the temperature of the furnace 1 at the desired value.

While the electrical network of Fig. 2 has been illustrated in connection with each of Figs. 14–20 for effecting the desired resetting adjustments of the latter arrangements, it will be apparent that the network connections illustrated in Figs. 1, 3 and 4 may be employed with equal facility for that purpose. Moreover, if it is desired to effect control with the Fig. 14–20 arrangements in accordance with the rate of the condition change and/or higher derivatives of the condition change, it will be apparent that any one of the network connections illustrated in Figs. 5–13 may be employed therein, as desired.

While in accordance with the provisions of the statutes, I have illustrated and described the best form of my invention now know to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control system, an electrical network, means to control an electrical characteristic of said network in response to a condition change, control means responsive to changes in said characteristic to control said condition in the direction to counteract said change, follow-up means independent of said control means responsive to changes in said characteristic to control said electrical network to at least partially neutralize said changes in characteristic, and reset means associated with said follow-up means to produce a further change in said characteristic in the same direction.

2. In a control system, an electrical network, electrical energizing means normally applying a predetermined potential on said network, means to control said energizing means to produce a change in the potential applied to said network in response to a condition change, control means responsive to changes in the potential applied to said network to control said condition in the direction to counteract said change, follow-up means independent of said control means and responsive to changes in the potential applied to said network to control said second mentioned means to at least partially neutralize said changes in potential, and reset means including an electrical reactance associated with said follow-up means to produce a further change in said potential in the same direction.

3. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connection of said first mentioned link thereto, an electrical network, an impedance included in said network and adapted to have an electrical characteristic thereof adjusted in accordance with the adjustments of said floating lever by said device in response to changes in said condition, control means responsive to the electrical state of said network to control said condition in the direction to counteract said change, and follow-up means independent of said control means to neutralize the effect of adjustment of said electrical characteristic of said impedance by said floating lever including electronic amplifying means having an input circuit connected to said network and an output circuit connected to said solenoid.

4. In a control system, means responsive to changes in a variable condition to be controlled, a floating lever, a link connecting said first mentioned means to said floating lever, a solenoid, a movable armature associated with said solenoid, a link connecting said movable armature to said lever at a point displaced from the point of connection of said first mentioned link thereto, an electrical network, an impedance included in said network and adapted to be adjusted in value in accordance with the adjustments of said floating lever in response to changes in said condition, control means responsive to the electrical state of said network to control said condition in the direction to counteract said change, and follow-up means independent of said control means to neutralize the effect of adjustment of said impedance by said floating lever including electronic amplifying means having an input circuit connected to said network and an output circuit connected to said solenoid.

5. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connection of said first mentioned link thereto, an electrical network, a source of energizing voltage for said network, an impedance included in said network and adapted to be adjusted by said floating lever to vary the voltage applied to said network, means to control said condition in the direction to counteract said change, electronic means responsive to the voltage applied to said network to control said control means, and follow-up means independent of said control means to neutralize the effect of adjustment of said impedance by said floating lever including electronic amplifying means having an input circuit connected to said network and an output circuit connected to said solenoid.

6. In a control system, a device responsive to changes in a variable condition to be controlled, a floating lever, a link connecting said device to said floating lever for adjusting the latter, a solenoid, a movable armature associated with said solenoid, a link connecting said movable armature to said lever at a point displaced from the point of connection of said first mentioned link thereto, an electrical network, a source of energizing voltage for said network adapted to be varied in accordance with the adjustments of said floating lever by said device, control means responsive to the voltage applied to the said network to control said condition in the direction to counteract said change, and follow-up means to neutralize the effect of variation of the voltage applied to said network including electronic amplifying means having an input circuit connected to said network and an output circuit connected to said solenoid.

7. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connection of said first mentioned link thereto, an electrical network, a variable source of energizing voltage for said network adapted to be varied in accordance with the adjustments of said floating lever in response to changes in said condition, electronic control means responsive to the voltage applied to said network to control said condition in the direction to counteract said change, and follow-up means to neutralize the effect of variation of the voltage applied to said network including electronic amplifying means having an input circuit connected to said network and an output circuit connected to said solenoid.

8. In a control system, means responsive to changes in a variable condition to be controlled, a floating lever having a member adjustable along the length thereof, a link connecting said first mentioned means to said floating lever for adjusting the latter, a solenoid, a movable armature associated with said solenoid, a link connecting said movable armature to said lever at a point displaced from the point of connection of the first mentioned link thereto, an electrical network, an adjustable impedance included in said network, a link connecting said adjustable impedance and said adjustable member, control means responsive to the voltage applied to the said network to control said condition in the direction to counteract said change, means to vary the position of said member along said floating lever to vary the throttling range of said system, and follow-up means to neutralize the effect of adjustment of said impedance by said floating lever including electronic amplifying means having an input circuit connected to said network and an output circuit connected to said solenoid.

9. In a control system, an electrical network including adjustable reactance means, electrical energizing means normally applying a predetermined potential on said network, means to control said energizing means to produce a change in the potential applied to said network in response to a condition change, control means responsive to changes in the potential applied to said network to control said condition in the direction to counteract said change, means to adjust said reactance means to vary the throttling range of said system, and follow-up means responsive to changes in the potential applied to said network to control said third mentioned means to at least partially neutralize said changes in potential.

10. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connection of said first mentioned link thereto, an electrical network, an impedance included in said network and adapted to have an electrical characteristic thereof adjusted in accordance with the adjustments of said floating lever by said device in response to changes in said condition, control means responsive to the electrical state of said network to control said condition in the direction to counteract said change, follow-up means to neutralize the effect of adjustment of the electrical characteristic of said impedance by said floating lever including electronic amplifying means having an input circuit connected to said network and an output circuit connected to said solenoid, and reset means included in said network to produce a further change in the electrical characteristic of said impedance in the same direction.

11. In a control system, an electrical network, electrical energizing means normally applying a predetermined potential on said network, means to control said energizing means to produce a change in the potential applied to said network in response to a condition change, control means responsive to changes in the potential applied to said network to control said condition in the direction to counteract said change, follow-up means responsive to changes in the potential applied to said network to control said second mentioned means to reduce said changes in potential, and reset means included in said network to produce a further change in the potential applied to said network in the same direction.

12. In a control system, an electrical network, electrical energizing means normally applying a predetermined potential on said network, a member adjustable in response to a condition change to control said energizing means to produce a change in the potential applied to said network, control means responsive to changes in the potential applied to said network to control said condition in the direction to counteract said change, follow-up means responsive to changes in the potential applied to said network to adjust said member to reduce said changes in potential, and physically stationary reset means included in said network to produce a further change in the potential applied to said network in the same direction.

13. In a control system, an electrical network, means to adjust said electrical network in response to a condition change, electronic discharge means having an input circuit and an output circuit, a connection between said electrical network and the input circuit of said electronic discharge means, means connected in the output circuit of said electronic discharge means to control said condition in the direction to counteract said change and thereby stabilize said condition, second electronic discharge means having an input circuit and an output circuit, means connected in the output circuit of said second mentioned electronic discharge means to adjust said electrical network to at least partially neutralize the adjustment of said network by said condition responsive means, and a connection between said electrical network and the input circuit of said second mentioned electronic discharge means to control said second mentioned electronic discharge means in accordance with the adjustments of said electrical network, said electrical network including means tending to dissipate the effect of adjustment thereof on the input circuit of said second mentioned electronic discharge means whereby said means connected in the output circuit of said second mentioned electronic discharge means produce a further adjustment of said electrical network in the same direction.

14. In a control system, a variable condition to be controlled, means responsive to changes in said condition, means to control said condition in the direction to counteract said change and thereby stabilize said condition, an electronic valve having an input circuit and an output circuit, means connected in the output circuit of said electronic valve to control said second mentioned means, a resistance, electrical current supply means for said resistance, a connection between said resistance and the input circuit of said valve, a device controlled by said condition responsive means to adjust said resistance and thereby to vary the potential drop produced across that resistance, a second electronic valve having an input circuit and an output circuit, relay means connected in the output circuit of said second mentioned electronic valve to control said device to at least partially neutralize the adjustment of said resistance by said condition responsive means, and means connecting said resistance to the input circuit of said second mentioned electronic valve, said last mentioned connecting means including electrical reactance means to dissipate the effect of changes in the potential drop across said resistance on the input circuit of said second mentioned valve.

15. In a control system, an electrical network, means to adjust said network in response to a condition change, control means responsive to said network adjustment to control said condition in the direction to counteract said change and thereby stabilize said condition, means in said network to additionally adjust said control means in the same direction immediately upon change in the trend of the value of said condition, and reset means to slowly further adjust said control means in the same direction at a rate proportional to the extent of said condition change for restoring said condition to a predetermined value.

16. In a control system, an electrical network, means to adjust said network in response to a condition change, control means responsive to said network adjustment to control said condition in the direction to counteract said change and thereby stabilize said condition, means in said network to additionally adjust said control means in the same direction immediately upon change in the trend of the value of said condition, and reset means including an electrical inductance connected in said network adapted to slowly further adjust said control means in the same direction and thereby restore said condition to a predetermined value.

17. In a control system, the combination of a device to be positioned to a plurality of positions for controlling the value of a condition, control means the state of which is varied in accordance with changes in the value of the condition to be controlled and having a desired state corresponding to a desired normal value of the condition, means for positioning said device in accordance with the state of said control means to maintain said condition at said desired normal value, means to additionally position said device in the same direction immediately upon change in the trend of the value of said condition, and reset means including an electrical inductance to further vary the state of said control means on departure of said condition from said normal value.

18. In a control system, an electrical network, electrical energizing means normally applying a predetermined potential on said network, means to control said energizing means to produce a change in the potential applied to said network in response to a condition change, control means to control said condition, a balanced relay comprising two opposed relay windings one of which is energized in accordance with the potential applied to said network and the other of which is energized in accordance with the position of said control means, electrical motor means controlled by said balanced relay to position said control means, follow-up means to control said second mentioned means to reduce said change in potential applied to said network, and reset means included in said network to produce a further change in the potential applied to said network in the same direction.

19. The combination of claim 16 wherein said follow-up means are physically stationary.

20. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connection of said first mentioned link thereto, an electrical network, an impedance included in said network and adapted to have an electrical characteristic thereof adjusted in accordance with the adjustments of said floating lever by said device in response to changes in said condition, control means responsive to the electrical state of said network to control said condition in the direction to counteract said change, follow-up means to neutralize the effect of adjustment of said electrical characteristic of said impedance by said floating lever including electronic amplifying means having its input circuit connected to said network and its output circuit connected to said solenoid, and means included in said network and responsive to changes in the value of said condition irrespective of the actual value thereof adapted to effect an additional corrective action on said condition in the same direction immediately upon change in the trend of the value of said condition.

21. In a control system, an electrical network, electrical energizing means normally applying a predetermined potential on said network, means to control said energizing means to produce a change in the potential applied to said network in response to a condition change, control means responsive to changes in the potential applied to said network to control said condition in the direction to counteract said change including follow-up means to control said second mentioned means to reduce said changes in potential, and means included in said network and responsive to changes in the value of said condition irrespective of the actual value thereof adapted to effect an additional corrective action on said condition in the same direction immediately upon change in the trend of the value of said condition.

22. The combination of claim 21 wherein said last mentioned means are adapted to temporarily effect an additional corrective action on said condition of an amount varying in accordance with the rate of change of said condition.

23. The combination of claim 21 wherein said last mentioned means are adapted to temporarily effect an additional corrective action on said condition of an amount varying in accordance with the rate of change of the rate of change of said condition.

24. The combination of claim 21 wherein said last mentioned means are adapted to temporarily effect an additional corrective action on said condition of an amount varying in accordance with the character of the condition change.

25. The combination of claim 21 wherein said last mentioned means are physically stationary.

26. The combination of claim 21 wherein said last mentioned means include electrical reactance means.

27. The combination of claim 21 wherein said last mentioned means include electrical capacitance means.

28. The combination of claim 21 wherein said last mentioned means include electrical inductance means.

29. In a control system, an electrical network, electrical energizing means normally applying a predetermined potential on said network, a member adjustable in response to a condition change to control said energizing means to produce a change in the potential applied to said network, control means responsive to changes in the potential applied to said network to control said condition in the direction to counteract said change and including follow-up means independent of said control means to adjust said member to reduce said changes in potential, and means included in said network and responsive to changes in the value of said condition irrespective of the actual value thereof adapted to effect an additional corrective action on said condition in the same direction immediately upon change in the trend of the value of said condition.

30. In a control system, an electrical network, means to adjust said network in response to a condition change, control means responsive to said network adjustments to control said condition in the direction to counteract said change and thereby stabilize said condition, follow-up means responsive to said network adjustments to control said electrical network to at least partially neutralize the effect of said adjustments upon said network, and electrical inductance means connected in said network and responsive to changes in the value of said condition irrespective of the actual value thereof to effect a further corrective action on said condition in the same direction immediately upon change in the trend of the value of said condition.

31. In a control system, an electrical network, means to adjust said electrical network in response to a condition change, electronic discharge means having an input circuit and an output circuit, a connection between said electrical network and the input circuit of said electronic discharge means, means connected in the output circuit of said electronic discharge means to control said condition in the direction to counteract said change and thereby stabilize said condition, second electron discharge means having an input circuit and an output circuit, means connected in the output circuit of said second mentioned electronic discharge means to adjust said electrical network to at least partially neutralize the adjustment of said network by said condition responsive means, and a connection between said electrical network and the input circuit of said second mentioned electronic discharge means to control said second mentioned electronic discharge means in accordance with the adjustments of said electrical network, said electrical network including means tending to delay the effect of adjustment thereof by said condition responsive means on the input circuit of said second mentioned electronic discharge means whereby delay in the adjustment of said electrical network by said means connected in the output circuit of said second mentioned electronic discharge means is effected.

32. In a control system the combination of a device adapted to be positioned to a plurality of positions for controlling the value of a condition, an electrical network, means to adjust said network in response to changes in said condition, control means responsive to said network adjustments to position said device in the direction to counteract said change, follow-up means responsive to said network adjustments to control said electrical network to at least partially neutralize the effect of said adjustments upon said network, and electrical inductance means connected in said network and responsive to changes in the value of said condition irrespective of the actual value thereof to temporarily further position said device in the same direction.

33. In a control system, a device responsive to changes in a variable condition to be controlled, a floating lever, a link connecting said device to said floating lever, a solenoid, a movable armature associated with said solenoid, a link connecting said movable armature to said lever at a point displaced from the point of connecton of said first mentioned link thereto, and electrical network, an impedance included in said network and adapted to have an electrical characteristic thereof adjusted in accordance with the adjustments of said floating lever by said device in response to changes in said condition, control means responsive to the electrical state of said network to control said condition in the direction to counteract said change, follow-up means to neutralize the effect of adjustment of said electrical characteristic of said impedance by said floating lever including electronic amplifying means having its input circuit connected to said network and its output circuit connected to said solenoid, means responsive to changes in the value of said condition irrespective of the actual value thereof and adapted to effect an additional corrective action on said condition in the same direction immediately upon change in the trend of the value of said condition, and reset means included in said network to slowly effect a further corrective action on said condition in the same direction.

34. In a control system, an electrical network, electrical energizing means normally applying a predetermined potential on said network, means to control said energizing means to produce a change in the potential applied to said network in response to a condition change, control means responsive to changes in the potential applied to said network to control said condition in the direction to counteract said change and including follow-up means to control said second mentioned means to reduce said change in the potential applied to said network, means responsive to changes in the value of said condition irrespective of the actual value thereof adapted to effect an additional corrective action on said condition in the same direction immediately upon change in the trend of the value of said condition, and reset means included in said network to slowly effect a further corrective action on said condition in the same direction.

35. In a control system, an electrical network, means to adjust said electrical network in response to a condition change, electronic discharge means having an input circuit and an output circuit, a connection between said electrical network and the input circuit of said electronic discharge means, means connected in the output circuit of said electronic discharge means to control said condition in the direction to counteract said change and thereby stabilize said condition, second electronic discharge means having an input circuit and an output circuit, means connected in the output circuit of said second mentioned electronic discharge means to adjust said electrical network to at least partially neutralize the adjustment of said network by said condition responsive means, and a connection between said electrical network and the input circuit of said second mentioned electronic discharge means to control said second mentioned electronic discharge means in accordance with the adjustments of said electrical network, said electrical network including means tending to delay change in the adjustment thereof by said condition responsive means on the input circuit of said electronic discharge means and tending to dissipate the effect of adjustment thereof on the input circuit of said second mentioned electronic discharge means.

36. In a control system, a variable condition to be controlled, means responsive to changes in said condition, means to control said condition in the direction to counteract said change and thereby stabilize said condition, an electronic valve having an input circuit and an output circuit, means connected in the output circuit of said electronic valve to control said second mentioned means, a resistance, electrical current supply means for said resistance, a connection between said resistance and the input circuit of said valve, a device controlled by said condition responsive means to vary the supply of current to said resistance and thereby to vary the potential drop produced across that resistance, a second electronic valve having an input circuit and an output circuit, relay means connected in the output circuit of said second mentioned electronic valve to control said device to at least partially neutralize the adjustment of said resistance by said condition responsive means, and means connecting said resistance to the input circuit of said second mentioned electronic valve, said last mentioned connecting means including electrical reactance means to delay the application of changes in the potential drop across said resistance to the input circuit of said second mentioned electronic valve and tending to dissipate the effect of changes in the potential drop across said resistance on the input circuit of said second mentioned electronic valve.

37. In a control system, an electrical network, means to adjust said network in response to changes in a variable condition to be controlled, control means responsive to network adjustments to control said condition, reset means including a capacitance in said network adapted following an adjustment of said network by said first mentioned means to initiate an additional network adjustment in the same sense, and rate control means including a capacitance in said network adapted to control the effect of the first mentioned adjustment in accordance with the rate of change of the rate of change of said condition.

38. In a control system, an electrical network, means to adjust said network in response to changes in a variable condition to be controlled, control means responsive to network adjustments to control said condition, reset means including a reactance in said network adapted following an adjustment of said network by said first means to initiate an additional network adjustment in the same sense, and rate control means included in said network adapted to control the effect of the first mentioned adjustment in accordance with the second or higher derivatives of the magnitude of the condition with respect to time.

39. In a control system, the combination of a device to be positioned to a plurality of positions for controlling the value of a variable condition, electrical control means the state of which is adapted to be varied in accordance with changes in the value of said condition and having a desired state corresponding to a desired normal value of said condition, means for positioning said device in accordance with the state of said control means to maintain said condition at said desired normal value, follow-up means to adjust said electrical control means to at least partially neutralize the variation of said electrical control means produced upon change in the value of said condition, and electrical inductance means included in said electrical control means and responsive to changes in the value of said condition irrespective of the actual value thereof to temporarily position said device immediately upon change in the trend of the value of said condition an additional amount varying in accordance with the rate of change of said condition.

40. In a control system, an electrical network, means to adjust said network in response to a condition change, control means responsive to said network adjustment to control said condition in the direction to counteract said change and thereby stabilize said condition, follow-up means responsive to said network adjustments to control said electrical network to at least partially neutralize the effect of said adjustments upon said network and rate control means including an inductance in said network adapted to control the effect of said first mentioned adjustment in accordance with the second or higher derivatives of the magnitude of said condition with respect to time.

41. In a control system, the combination of a device to be positioned to a plurality of positions for controlling the value of a variable condition, electrical control means the state of which is adapted to be varied in accordance with changes in the value of said condition and having a desired state corresponding to a desired normal value of said condition, means for positioning said device in accordance with the state of said control means to maintain said condition at said desired normal value, follow-up means to adjust said electrical control means to at least partially neutralize the variation of said electrical control means produced upon change in the value of said condition, electrical inductance means included in said electrical control means and responsive to changes in the value of said condition irrespective of the actual value thereof to temporarily position said device immediately upon change in the trend of the value of said condition an additional amount varying in accordance with the first, second and higher derivatives of the magnitude of the condition with respect to time, and means to adjust said inductance means to vary the relative magnitudes of the effects of each of said derivatives with respect to the others.

42. In a control system, an electrical network, means to adjust said network in response to a condition change, control means responsive to said network adjustment to control said condition in the direction to counteract said change and thereby stabilize said condition, follow-up means responsive to said network adjustments to control said electrical network to at least partially neutralize the effect of said adjustments upon said network, rate control means including inductance means in said network to control the effect of said first mentioned adjustment in accordance with the second or higher derivatives of the magnitude of said condition with respect to time, and means to adjust said inductance means to vary the magnitude of each of said derivatives with respect to the others.

HARRY S. JONES.